(12) United States Patent
Martinelli et al.

(10) Patent No.: US 7,307,722 B2
(45) Date of Patent: Dec. 11, 2007

(54) POLARIZATION STABILIZATION

(75) Inventors: Mario Martinelli, San Donato Milanese (IT); Paolo Martelli, Milan (IT); Silvia Maria Pietralunga, Cassina De Pecchi (IT)

(73) Assignee: Pirelli & C. S.p.A., Milan (IT)

( * ) Notice: Subject to any disclaimer, the term of this patent is extended or adjusted under 35 U.S.C. 154(b) by 433 days.

(21) Appl. No.: 10/485,221

(22) PCT Filed: Jul. 30, 2002

(86) PCT No.: PCT/EP02/08467

§ 371 (c)(1),
(2), (4) Date: Aug. 9, 2004

(87) PCT Pub. No.: WO03/014811

PCT Pub. Date: Feb. 20, 2003

(65) Prior Publication Data

US 2004/0262499 A1    Dec. 30, 2004

Related U.S. Application Data

(60) Provisional application No. 60/310,236, filed on Aug. 7, 2001.

(30) Foreign Application Priority Data

Aug. 3, 2001    (EP) .................................. 01306683

(51) Int. Cl.
*G01J 4/00*    (2006.01)
(52) U.S. Cl. ........................ 356/365; 356/370
(58) Field of Classification Search ............... None
See application file for complete search history.

(56) References Cited

U.S. PATENT DOCUMENTS

| 4,979,235 | A | | 12/1990 | Rumbaugh et al. |
| 5,005,952 | A | | 4/1991 | Clark et al. |
| 5,191,387 | A | | 3/1993 | Ichikawa et al. |
| 5,212,743 | A | * | 5/1993 | Heismann .................... 385/11 |
| 5,327,511 | A | * | 7/1994 | Heismann et al. ............ 385/14 |
| 5,659,412 | A | * | 8/1997 | Hakki ........................ 398/152 |

(Continued)

OTHER PUBLICATIONS

Saleh et al.; "Electro-Optics", Fundamentals of Photonics, John Wiley & Sons, Inc., Chapter 18, pp. 712-719, (1991).

(Continued)

*Primary Examiner*—Gregory J. Toatley, Jr.
*Assistant Examiner*—Juan D. Valentin, II
(74) *Attorney, Agent, or Firm*—Finnegan, Henderson, Farabow, Garrett & Dunner, L.L.P.

(57) ABSTRACT

A polarization stabilizing device and method based on controlling the phase retardation of a pair of variable phase retarders with a controller such that the first of the variable retarders has its phase retardation switched between first and second values whenever the phase retardation of the second of the variable retarders reaches an upper or a lower limit. The upper and lower limits of the second retarder and the first and second values of the first retarder are chosen so that discontinuities in the power of the output optical signal are avoided when the first variable retarder is switched, thereby providing endless polarization stabilization using phase retarders that themselves have only limited retardation ranges.

23 Claims, 13 Drawing Sheets

U.S. PATENT DOCUMENTS

| | | | | |
|---|---|---|---|---|
| 5,930,414 | A * | 7/1999 | Fishman et al. | 385/11 |
| 6,330,375 | B1 * | 12/2001 | Fishman et al. | 385/11 |
| 6,404,537 | B1 * | 6/2002 | Melman et al. | 359/323 |
| 6,411,750 | B1 * | 6/2002 | Fishman et al. | 385/11 |
| 6,765,670 | B2 * | 7/2004 | Olsson et al. | 356/327 |
| 7,085,052 | B2 * | 8/2006 | Patel et al. | 359/497 |

OTHER PUBLICATIONS

Noè; "Endless Polarisation Control in Coherent Optical Communications", Electronics Letters, vol. 22, No. 15, pp. 772-773, (1986).

Noè; "Endless Polarisation Control Experiment with Three Element of Limited Birefringence Range", Electronics Letters, vol. 22, No. 25, pp. 1341-1343 (1986).

Walker et al.; "Endless Polarisation Control Using Four Fibre Squeezers", Electronics Letters, vol. 23, No. 6, pp. 290-292, (1987).

Noè et al.; "Endless Polarisation Control System for Coherent Optics", Journal of Lightwave Technology, vol. 6, No. 7, pp. 1199-1207, (1988).

Aarts et al.; "New Endless Polarization Control Method Using Three Fiber Squeezers", Journal of Lightwave Technology, vol. 7, No. 7, pp. 1033-1043, (1989).

Walker et al.; "Polarization Control for Coherent Communications", Journal of Lightwave Technology, vol. 8, No. 3, pp. 438-458, (1990).

Rumbaugh et al.; "Polarization Control for Coherent Fiber-Optic Systems Using Nematic Liquid Crystals", Journal of Lightwave Technology, vol. 8, No. 3, pp. 459-465, (1990).

Jerrard; "Modern Description of Polarized Light: Matrix Methods", Optics and Laser Technology, pp. 309-319, (1982).

Chiba et al.; "Polarization Stabilizer Using Liquid Crystal Rotatable Waveplates", Journal of Lightwave Technology, vol. 17, No. 5, pp. 885-890, (1999).

Imai et al.; "Optical Polarisation Control Utilising An Optical Heterodyne Detection Scheme", Electronics Letters, vol. 21, No. 2, pp. 52-53, (1985).

Kubota et al.; "Electro-Optical Polarisation Control on Single-Mode Optical Fibres", Electronics Letter, vol. 16, No. 15, p. 573, (1980).

Okoshi; "Polarization-State Control Schemes For Heterodyne or Homodyne Optical Fiber Communications", Journal of Lightwave Technology, vol. LT-3, No. 6, pp. 1232-1237, (1985).

Mahon et al.; "Endless Polarisation State Matching Control Experiment Using Two Controllers Of Finite Control Range", Electronics Letters, vol. 23, No. 23, pp. 1234-1235, (1987).

Ascham et al.; "A Practical Liquid Crystal Polarisation Controller", 16th European Conference on Optical Communication, Amsterdam, Netherlands, vol. 1, pp. 393-396, (1990).

Rysdale; "Method overcoming Finite-Range Limitation of Certain State of Polarisation Control Devices in Automatic Polarisation Control Schemes", Electronics Letters, vol. 22, No. 2, pp. 100-102, (1986).

Prat et al.; "Experimental Demonstration of an All-Fiber Endless Polarization Controller Based on Faraday Rotation", IEEE Photonics Technology Letters, vol. 7 No. 12, pp. 1430-1432 (1995).

Mohr et al.; "Active Polarization Stabilization Systems for use with Coherent Transmission System or Fibre-optic Sensors", 9th European Conference of Optical Communication, Geneva, Switzerland, pp. 313-316, (1983).

* cited by examiner

POLARIZATION STABILIZATION

CROSS REFERENCE TO RELATED APPLICATIONS

This application is a national phase application based on PCT/EP02/08467, filed Jul. 30, 2002, the content of which is incorporated herein by reference, and claims the priority of European Patent Application No. 01306683.2, filed Aug. 3, 2001, and claims the benefit of U.S. Provisional Application No. 60/310,236, filed Aug. 7, 2001.

BACKGROUND OF THE INVENTION

The invention relates to polarization stabilization, more especially to devices and methods for stabilizing the polarization state of an optical signal of arbitrary, possibly time variant, polarization.

A polarization stabilizer is a device that transforms an input optical beam into an output optical beam with fixed state-of-polarization (SOP) and optical power not dependent on the input SOP. Such a device is useful in coherent optical receivers for matching the SOP between the signal and the local oscillator, in fiber optic interferometric sensors, and in optical systems with polarization sensitive components. A fundamental requirement is the endlessness in control, meaning that the stabilizer must compensate in a continuous way for the variations of input SOP.

Several polarization control schemes based on finite range components have been presented [1-12]. In such schemes, in order to achieve an endless control, it is necessary to provide a reset procedure when a component reaches its range limit so that the output SOP does not change during the reset.

Generally, reset procedures can be problematic in that they are often associated with complex control algorithms designed to avoid loss of feedback control during the reset.

SUMMARY OF THE INVENTION

According to the invention there is provided an endless polarization stabilizer based on one or more pairs of phase retardation components that each have finite tuning ranges, as well as a polarization stabilizing method based on a simple feedback control algorithm.

According to a first aspect of the invention there is provided a polarization stabilizing device for stabilizing the state of polarization of an optical signal having an arbitrary time variable polarization state and an input power, comprising:

a retarder pair comprising first and second variable retarders operable to provide respective first and second phase retardations to the optical signal, wherein the first and second variable retarders have respective eigenaxes oriented at approximately ±45 degrees relative to each other;

an optical element arranged to receive the optical signal from the second variable retarder and having an azimuth extending approximately parallel or perpendicular to the first variable retarder so as to pass a polarized component of the optical signal containing a fraction of the input power, a detection arrangement for obtaining a measurement signal indicative of the fraction of the input power of the optical signal contained in the polarized component; and a controller connected to receive the measurement signal, and connected to supply first and second control signals to the first and second variable retarders, wherein the controller is configured to set the first and second control signals responsive to the measurement signal so as to maintain the fraction of the input power in the polarized component at a target value.

In a specific embodiment, the controller is configured to use the second control signal to smoothly vary (preferably in a quasi-continuous stepwise manner) the second phase retardation over a range of at least $\pi$ radians responsive to the measurement signal, and to use the first control signal to discretely change the first phase retardation between first and second values. Example ranges are 0-$\pi$ radians, 0-3$\pi$ radians, 0-5$\pi$ radians, or any other odd integer multiple of $\pi$ radians. In an example, the first and second values of the first phase retardation are zero and $\pi$ radians. In an example, the range of variation of the second phase retardation is $\pi$ radians.

The optical element may be a polarizing beam splitter, a linear polarizer or any other free-space optical, optical fiber or planar waveguide component or components capable of measuring the power fraction of an optical signal contained in a specific polarization state.

To account for power fluctuations in the input optical signal, a further detection arrangement may be included for measuring a further measurement signal indicative of the power of the optical signal, and connected to supply the further measurement signal to the controller, wherein the controller is configured to set the first and second control signals responsive to the further measurement signal, so as to maintain the power of the polarized component passed by the optical element at a desired value.

The target value for the power fraction in the polarized component may be between 0.1 and 0.5, or 0.2 and 0.4 in a first embodiment of the invention.

In a second aspect of the invention a two-stage device is provided, with each stage comprising a pair of variable retarders, and each pair of variable retarders being independently controlled.

According to the second aspect of the invention there is provided a polarization stabilizing device for stabilizing the state of polarization of an optical signal having an arbitrary time variable polarization state and an input power, comprising a first stage and a second stage arranged to receive output from the first stage, the first stage comprising:

a first-stage retarder pair comprising first and second variable retarders operable to provide respective first and second phase retardations to the optical signal, wherein the first and second variable retarders have respective eigenaxes oriented at approximately ±45 degrees relative to each other, a first-stage optical element arranged to receive the optical signal from the second variable retarder and having an azimuth extending approximately parallel or perpendicular to the first variable retarder so as to pass a polarized component of the optical signal containing a fraction of the input power;

a first-stage detection arrangement for obtaining a measurement signal indicative of the fraction of the input power of the optical signal contained in the polarized component; and a first-stage controller connected to receive the measurement signal, and connected to supply first and second control signals to the first and second variable retarders, wherein the first-stage controller is configured to set the first and second control signals responsive to the measurement signal so as to supply the optical signal to the first variable retarder in an elliptical state of polarization that belongs to a great circle on a Poincaré sphere, and the second stage comprising:

a second-stage retarder pair comprising first and second variable retarders operable to provide respective first and second phase retardations to the optical signal, wherein the first and second variable retarders have respective eigenaxes oriented at approximately ±45 degrees relative to each other;

a second-stage optical element arranged to receive the optical signal from the second variable retarder and having an azimuth extending at approximately 0 or 90 degrees to the eigenaxes of the first variable retarder so as to pass a polarized component of the optical signal containing a fraction of the input power;

a second-stage detection arrangement for obtaining a measurement signal indicative of the fraction of the input power of the optical signal contained in the polarized component; and a second-stage controller connected to receive the measurement signal, and connected to supply first and second control signals to the first and second variable retarders, wherein the second-stage controller is configured to set the first and second control signals responsive to the measurement signal so as to maintain the fraction of the input power in the polarized component at a target value.

In the second aspect of the invention the target value for the power fraction in the polarized component may be between 0.1 and 1, the two-stage device allowing lower losses than the one-stage device, and hence a target power fraction of above 0.5 to be set.

According to a third aspect of the invention there is provided a method of transforming an input optical signal of arbitrary state of polarization (SOP) into an output optical signal of a defined SOP and of a power that is independent of the arbitrary SOP of the input optical signal, the method comprising:

providing first and second variable retarders having controllable phase retardation and respective eigenaxes oriented at approximately ±45 degrees relative to each other, providing an optical element arranged to receive the optical signal from the second variable retarder and having an azimuth extending approximately parallel or perpendicular to the first variable retarder, and controlling the phase retardation of the first and second retarders so as to transform the arbitrary SOP of the input optical signal into an output optical signal of a defined SOP and of a power that is independent of the arbitrary SOP of the input optical signal.

The first and second retarders are controlled in an embodiment so as to change the phase retardation of the first retarder discretely between first and second values, and so as to change the phase retardation of the second retarder continuously or quasi-continuously within a range defined by upper and lower limits, the phase retardation of the first retarder being switched between its first and second values responsive to the phase retardation of the second retarder reaching its upper or lower limit.

In an example, the first and second values of the phase retardation of the first retarder correspond to the upper and lower limits of the phase retardation of the second retarder.

According to a fourth aspect of the invention there is provided a method of transforming an input optical signal of arbitrary state of polarization (SOP) into an output optical signal of a defined SOP and of a power that is independent of the SOP of the input optical signal, the method comprising:

providing first and second stages, each comprising first and second variable retarders having controllable phase retardation;

providing an optical element in the second stage for passing a polarized component of the optical signal received from the second variable retarder of the second stage;

receiving an input optical signal having an arbitrary SOP at the first stage;

controlling the phase retardation of the first and second retarders of the first stage so as to transform the arbitrary SOP of the input optical signal into an optical signal of elliptical SOP;

receiving the optical signal of elliptical SOP from the first stage into the second stage; and controlling the phase retardation of the first and second retarders of the second stage so as to transform the optical signal of elliptical SOP into an output optical signal of a defined SOP and of a power that is independent of the arbitrary SOP of the input optical signal.

The elliptical SOP can be represented by a point belonging to a great circle of the Poincaré sphere defined by the relative orientation of the variable retarders.

In an embodiment of this aspect of the invention, for each of the first and second stages, the first and second retarders are controlled so as to change the phase retardation of the first retarder discretely between first and second values, and so as to change the phase retardation of the second retarder continuously or quasi-continuously within a range defined by upper and lower limits, the phase retardation of the first retarder being switched between its first and second values responsive to the phase retardation of the second retarder reaching its upper or lower limit In an embodiment of this aspect of the invention, the first and second variable retarders have respective eigenaxes oriented at approximately ±45 degrees relative to each other, wherein the optical element of the second stage has an azimuth extending approximately parallel or perpendicular to the eigenaxes of the first variable retarder of the second stage, and wherein the eigenaxes of the first variable retarder of the second stage are oriented at approximately ±45 degrees relative to the eigenaxes of the first variable retarder of the first stage.

Moreover, for each of the first and second stages, the first and second values of the phase retardation of the first retarder may correspond to the upper and lower limits of the phase retardation of the second retarder.

In the third and fourth aspects of the invention, the defined SOP of the output optical signal may be a fixed linear SOP, or some other defined SOP such as elliptical, circular, rotating linear etc.

BRIEF DESCRIPTION OF THE DRAWINGS

For a better understanding of the invention and to show how the same may be carried into effect reference is now made by way of example to the accompanying drawings.

DETAILED DESCRIPTION

1. First Embodiment: Single-stage Configuration

Figure 1A:
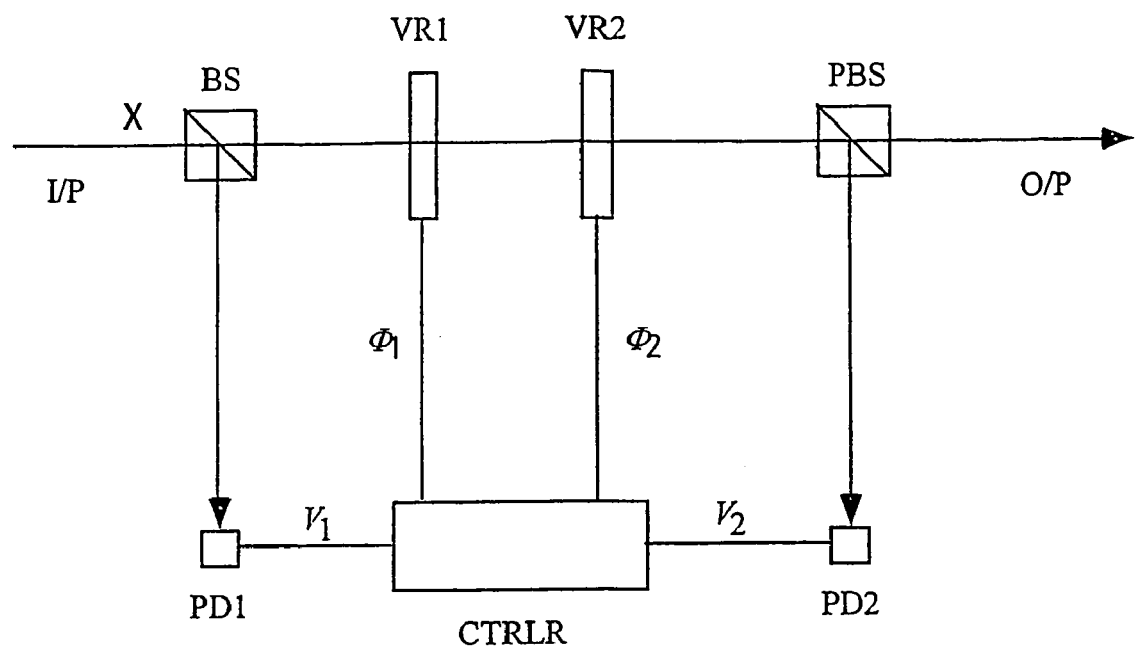
FIG. 1a. Schematic drawing of a single-stage endless polarization stabilizer according to a first embodiment comprising first and second variable retarders.

FIG. 1a shows a single-stage polarization stabilizer according to a first embodiment of the invention. The device has a principal beam path 'x' along which an optical beam is received as an input optical beam (labeled I/P in the figure) of unknown state of polarization (SOP), traverses a number of optical components BS, VR1, VR2, PBS of the device that collectively serve to stabilize the SOP, and is emitted from the device as an output optical beam (labeled O/P in the figure) with a fixed SOP.

The device comprises first and second variable retarders VR1 and VR2 which are linearly birefringent elements with fixed eigenaxes and controllable phase retardation.

A polarization insensitive beam-splitter BS (e.g. with a 90/10 split ratio) is arranged in the beam path 'x' to extract a small fraction (e.g. 10% in this example) of the input optical beam. It will be appreciated that other optical components can provide the same function of extracting a small fraction of the beam, for example an optical fiber coupler. The extracted fraction of the input optical beam is directed to a photodiode PD1 which serves to measure the power of the extracted fraction.

After propagation through the cascade of the two variable retarders VR1 and VR2, the optical signal is incident upon a polarizing beam splitter PBS. The PBS extracts a polarized component portion of the optical beam and directs it to a second photodiode PD2, which serves to measure the power of this extracted portion. The beam transmitted by the PBS is the linearly polarized output optical beam. It will be appreciated that any other optical arrangement for performing the same function may be used instead of a polarizing beam splitter. For example a polarization insensitive beam splitter followed by two linear polarizers, one for each output component of the polarization insensitive beam splitter is functionally the same as a polarizing beam splitter. Optical fiber components can also be used to provide the same function. Another variation would be to replace the polarizing beam splitter PBS with a polarization insensitive beam splitter, and to arrange a linear polarizer between the polarization insensitive beam splitter and the second retarder VR2. In this variant, the second photodiode would be unchanged, receiving the reflected fraction of the light from the polarization insensitive beam splitter used instead of the polarizing beam splitter.

The photodiodes PD1 and PD2 provide respective electrical signals $V_1$ and $V_2$, and these are sent to an electronic controller CTRLR. Responsive to the electrical signals $V_1$ and $V_2$, the controller CTRLR generates output control signals $\Phi_1$ and $\Phi_2$ according to a control algorithm described further below. The output control signals $\Phi_1$ and $\Phi_2$ are sent to and control the phase retardations of the retarders VR1 and VR2 respectively.

The control loop will have a characteristic delay time, for example in the microsecond range limited by analogue-to-digital and digital-to-analogue converters that may be present at the input and output of the controller CTRLR. Moreover, SOP fluctuations which need to be canceled out in the input optical beam will typically also have a characteristic time constant, e.g. in the MHz range for optical fiber transmission. This may be much slower than the data rate data being carried on the optical signal which may be in the GHz range (Gbit/s). For these reasons, the photodiodes PD1 and PD2 may advantageously be selected to have a limited bandwidth, for example of 1 MHz, so that provision of separate filters is not required. In general it is preferred that the bandwidth of the photodiodes is matched to the cycle time of the control loop and the minimum stabilization time constant required for the application concerned.

The eigenaxes of the first variable retarder VR1 are oriented at approximately ±45° with respect to the eigenaxes of the second variable retarder VR2. The azimuth of the PBS is approximately parallel to the eigenaxis of the first variable retarder VR1. In alternative embodiments, the PBS could be aligned at 90 degrees relative to the first variable retarder VR1. Moreover, the azimuth of an eigenaxis of VR1 is equal to the azimuth of the output linear state of polarization (SOP) transmitted by the PBS.

The tolerance of the device to slight misalignments of the components VR1, VR2 and PBS has been investigated. In order to have a relative error in the output power of less then 5%, the tolerance range for the relative orientation between each variable retarder and the polarizer is ±0.25 degrees for a step angle of 1 degree (see below for a description of step angle). In order to have a relative error in the output power of less then 10%, the tolerance range for the relative orientation between each variable retarder and the polarizer is ±0.5 degrees for a step angle of 2 degrees. It is thus preferred that the alignment of retarder VR2 and PBS each differs by less than 1 degree from the alignment of retarder VR1, more preferably by less than 0.5 degrees.

The feedback control loop is designed to stabilize the output optical power so that the power component transmitted by the PBS is equal to power component reflected by the PBS. In this case, the stabilized output power is half of the maximum output power obtainable in open loop by varying the input SOP. More precisely the aim of the control loop is to minimize the error defined as $\epsilon=|V_1-\alpha V_2|$, where the parameter $\alpha$ is fixed so that the error is zero when the output power is half of the maximum output power obtainable in open loop by varying the input SOP. For example, in the case of the first embodiment with ideal optical components with no optical losses (i.e. a lossless 90/10 BS and a lossless 50/50 PBS) and with photodiodes PD1, PD2 having equal responsivities, then the value of $\alpha$ should be 2/9.

The minimization of the error is achieved by controlling the phase retardations of the two variable retarders VR1 and VR2. The retardation $\Phi_2$ of VR2 is varied smoothly in the range from 0 to $\pi$ radians. When the retardation $\Phi_2$ reaches a range limit (0 or $\pi$), then the retardation $\Phi_1$ of the other retarder VR1 is switched between the values 0 and $\pi$ radians. In the normal mode of operation, when the retardation of VR2 is not at a range limit, then the retardation of VR1 is kept constant at 0 or $\pi$ radians. The switching of the retardation of VR1 allows one to overcome the finite birefringence range of VR2 and to obtain an endless polarization stabilization. The eigenaxes of VR1 and VR2 are oriented so that the output optical power is not appreciably perturbed during the switching, provided that the input SOP variation is sufficiently small in the switching time.

Figure 1B:
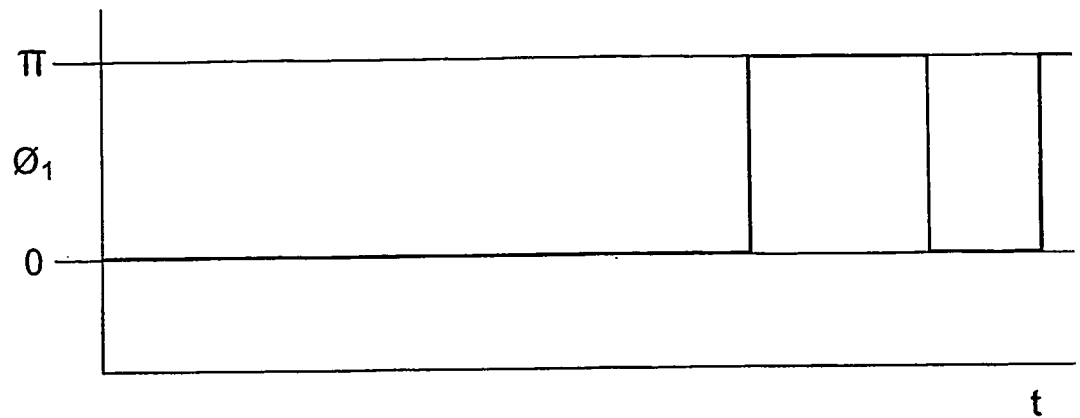
FIG. 1b. Graph of an example evolution of retardation $\Phi_1$ of the first variable retarder with time 't', for an input optical signal of arbitrarily fluctuating state of polarization (SOP).
Figure 1C:
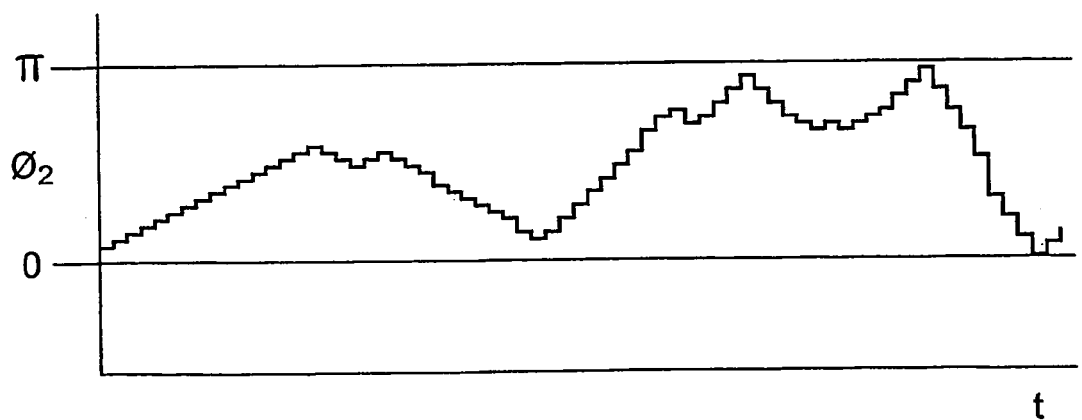
FIG. 1c. Graph of an example evolution of retardation $\Phi_2$ of the second variable retarder with time 't', for the same example as FIG. 1b.

FIG. 1$b$ and FIG. 1$c$ are schematic graphs (not taken from real data) plotting the varying phase retardations $\Phi_1$ and $\Phi_2$ applied to the retarders VR1 and VR2 respectively for an arbitrarily varying example input optical signal. As can be seen from FIG. 1$c$, the phase retardation $\Phi_2$ applied to the second variable retarder VR2 is incrementally varied in a quasi-continuous manner, with a discretization that follows from the stepwise incremental nature of the computer-implemented control scheme. It is convenient that the steps in the phase retardation $\Phi_2$ have a constant step angle, although non-constant step angles, for example dependent on the absolute value of the phase retardation $\Phi_2$, could be used. As can be seen from both graphs viewed together, whenever the input SOP varies to cause the second variable retarder VR2 to reach a phase retardation $\Phi_2$ of 0 or $\pi$ radians, the phase retardation $\Phi_1$ of the first variable retarder VR1 is switched between the values 0 and $\pi$ radians, as already described above. At the same time the sign of the phase retardation increments on the second variable retarder is reversed. A control algorithm for implementing this optimization strategy is described in detail further below.

Figure 2:
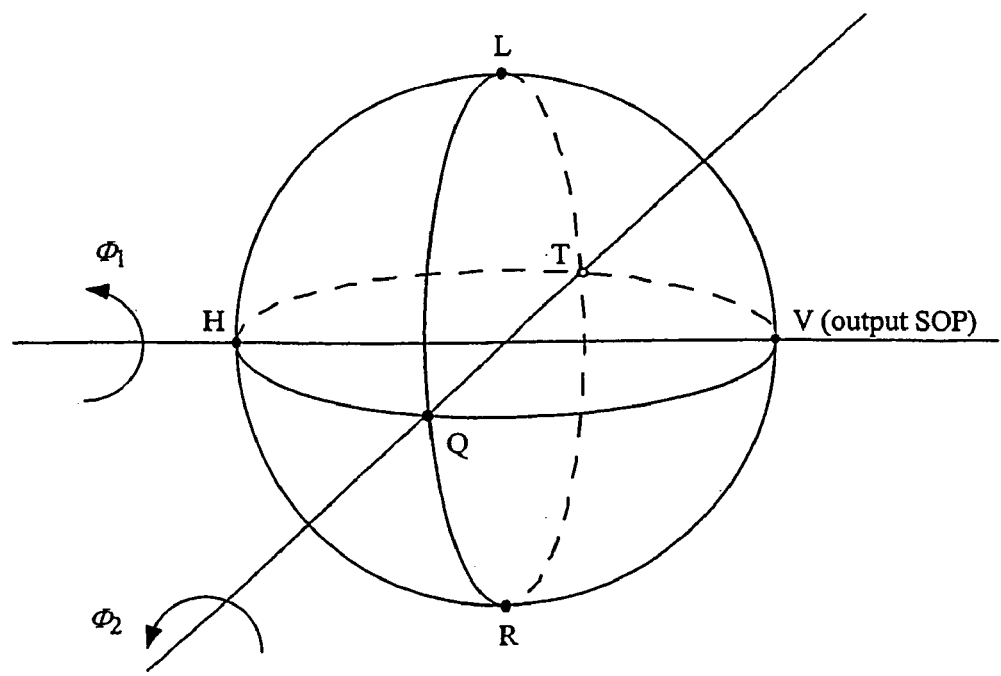
FIG. 2. Poincaré sphere representation of the single-stage polarization stabilizer.

FIGS. 2 and 3$a$-$d$ are now referred to to explain the principles of operation of the proposed single-stage polarization stabilizer in terms of a Poincaré sphere representation [13].

Each SOP is represented by a point on the sphere, with longitude $2\eta$ and latitude $2\xi$. The angle $\eta$ is the azimuth of the major axis of the polarization ellipse and the quantity $\tan\xi$ is the ellipticity with sign plus or minus according to whether the SOP is left-handed or right-handed. The poles L and R correspond to the left ($\xi=45°$) and the right ($\xi=-45°$) circular SOP respectively. The points on the equator represent linearly polarized light with different azimuths $\eta$. In particular the points H and V correspond to the horizontal ($\eta=0°$) and the vertical ($\eta=90°$) linear SOP respectively. The points Q and T correspond to the linear SOP with azimuth $\eta=45°$ and $\eta=-45°$ respectively.

The effect of the propagation through a birefringent element is represented on the Poincaré sphere by a rotation about a suitable axis. The diametrically opposite points corresponding to the orthogonal eigenstates of birefringence belong to this axis of rotation. The angle of rotation is equal to the phase difference introduced by the birefringent elements between the eigenstates. The action of a polarizer is to transmit only the component of light in a fixed SOP. The transmitted fraction of the incident optical power is $\cos^2(\phi/2)$, where $\phi$ is the angle at the center of the sphere between the representative points of incident and transmitted SOP. A simple polarization stabilizer is constituted by a linearly birefringent element with variable phase retardation followed by a linear polarizer.

The eigenaxes of the variable retarder are oriented at ±45° with respect to the maximum transmission axis of the PBS or other polarizer. Without loss of generality, the transmitted SOP by the polarizer can be considered as the vertical linear state, represented by the point V. The action of the variable retarder is a rotation around the axis including the points Q and T by an angle equal to the phase retardation.

By suitably controlling the phase retardation in the range between 0 and $\pi$ radians, any input SOP is transformed into a SOP represented on the Poincaré sphere by a point belonging to the great circle including the points L and Q, that is an elliptical SOP with axes oriented at ±45°. Each SOP corresponding to a point belonging to this great circle is transmitted into the vertical linear SOP by the output polarizer with the same power loss of 3 dB. In such a way a polarization stabilizer is realized, but it is not endless because of the limited range of phase retardation. For example, if the representative point of the input SOP rotates in a fixed direction on the great circle including L and V, then it would be necessary an unlimited variation of the phase retardation, in order to keep the representative point of the SOP transmitted by the variable retarder endlessly on the great circle including L and Q.

In the proposed polarization stabilizer design, to achieve an endless control, there is provided a further variable retarder that is controlled to commute (i.e. switch) its phase retardation between 0 and $\pi$ radians when the phase retardation of the smoothly varied retarder reaches a range limit. The action of the switched variable retarder is represented by a rotation around the axis including the points H and V, corresponding to the eigenaxes oriented at ±45° with respect to the eigenaxes of the smoothly varied retarder (see FIG. 2).

The endlessness of this control scheme can be illustrated for instance in case of a representative point of the input SOP rotating in a fixed direction on a circle of the Poincaré sphere.

FIGS. 3a-3d represent the SOP evolution from the input to the output of the polarization stabilizer at four instants, by showing the projection of the Poincaré sphere onto the plane including the points H, V and L. The points $P_{in}$, $P_1$ and $P_2$ represents respectively the input SOP, the SOP transmitted by the switched retarder and the SOP transmitted by the smoothly varied retarder. The output SOP is the linear state transmitted by the final polarizer, represented by the point V.

Figure 3A:
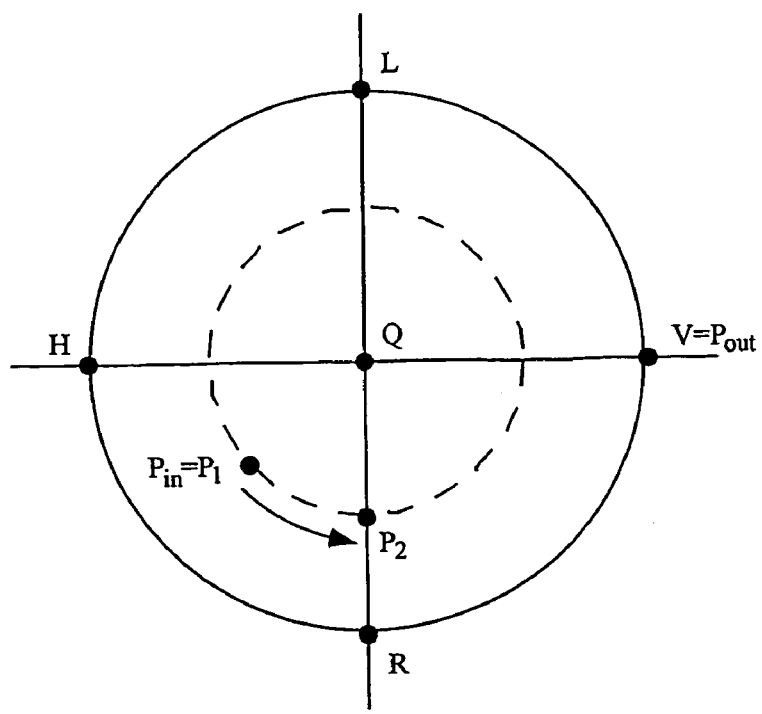
FIG. 3a. Transformation of the SOP representative point on a Poincaré sphere in the propagation through the single-stage polarization stabilizer, for $\Phi_1=0$ and $\Phi_2=\pi/4$.
Figure 3B:
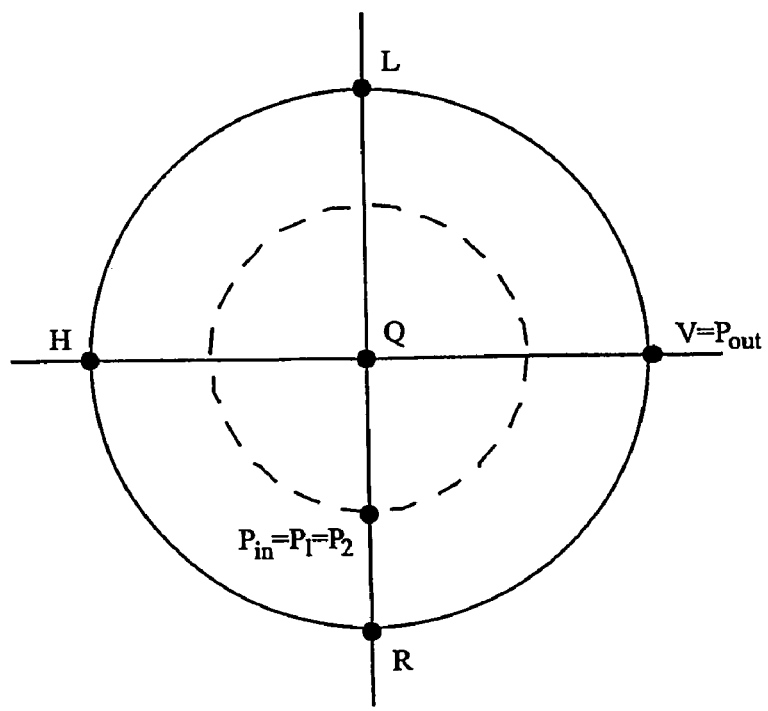
FIG. 3b. Transformation of the SOP representative point on the Poincaré sphere in the propagation through the single-stage polarization stabilizer, for $\Phi_1=0$ and $\Phi_2=0$.
Figure 3C:
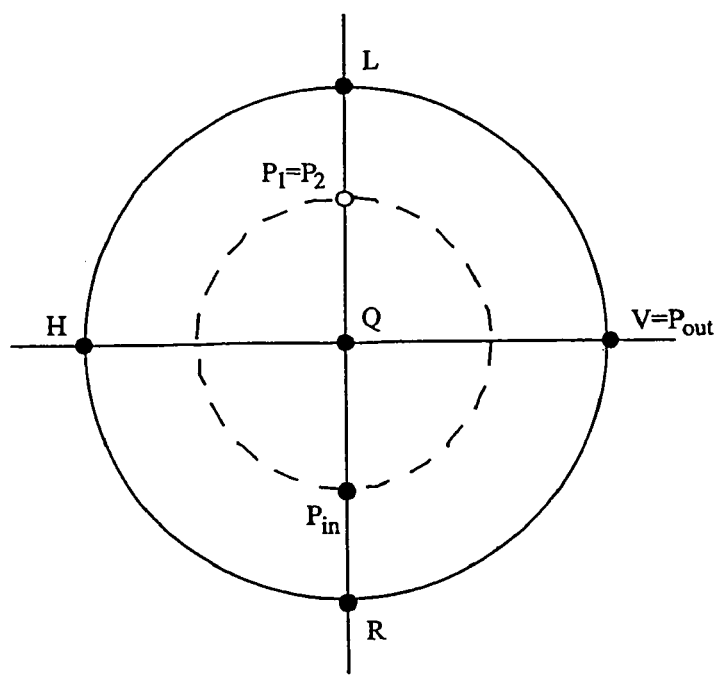
FIG. 3c. Transformation of the SOP representative point on the Poincaré sphere in the propagation through the single-stage polarization stabilizer, for $\Phi_1=\pi$ and $\Phi_2=0$.
Figure 3D:
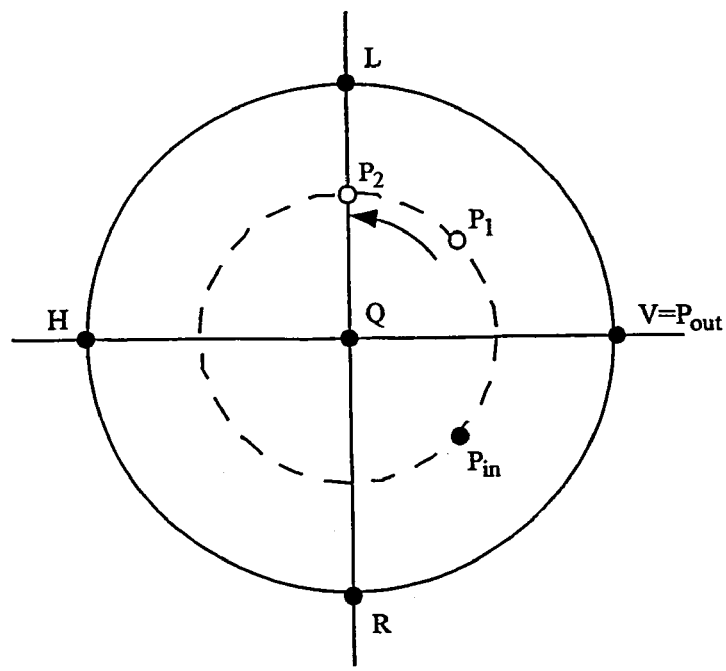
FIG. 3d. Transformation of the SOP representative point on the Poincaré sphere in the propagation through the single-stage polarization stabilizer, for $\Phi_1=\pi$ and $\Phi_2=\pi/4$.

Initially (FIG. 3a) the point $P_1$, coincident with $P_{in}$, is transformed into the point $P_2$ by the action of the smoothly varied retarder with phase retardation $\Phi_2=\pi/4$, while the phase retardation of the switched retarder is $\Phi_1=0$. The successive variation of $P_{in}$ is compensated by decreasing the phase retardation $\Phi_2$ till to zero when the point $P_{in}$ intercepts the great circle including L and Q (FIG. 3b). The further variation of $P_1$ can not be compensated simply by decreasing $\Phi_2$ because it has reached the lower limit. Therefore, in order to obtain an endless control, the phase retardation $\Phi_1$ is commuted to $\pi$, while $\Phi_2$ is kept equal to zero. The point $P_2$ is coincident to $P_1$ which is obtained from $P_{in}$ by means of a rotation of 180° around the axis including H and V (FIG. 3c). Now the successive variation of Pin is compensated by increasing $\Phi_2$ (FIG. 3d).

It is important to note that during the commutation of the first phase retardation the point $P_2$ moves always on the great circle including L and Q. This general property assures that this commutation does not perturb the output power, provided that the input SOP is nearly constant during the commutation. If this condition is fulfilled, then nearly half of the optical power incident onto the output polarizer is transmitted in any instant during the commutation, obtaining an endless polarization stabilization. In particular the commutation of $\Phi_1$ causes a commutation of the point $P_2$ between two diametrically opposite positions, that is a commutation of the SOP transmitted by the smoothly varied retarder between two orthogonal states.

In summary, to achieve the necessary endless control, the proposed polarization stabilizer design provides a pair of variable phase retarders arranged in a common beam path. The second retarder in the beam path is controlled so as to smoothly vary its tuning within a limited range. When the second retarder reaches one of its tuning limits, the phase retardation on the first retarder is switched or commuted with a toggling function.

It will be appreciated that the first embodiment provides an output optical signal having a fixed linear SOP. However, other devices based on this design could provide any other defined SOP that may be desired. For example, circularly polarized light, or elliptically polarized light, or linearly polarized light with a time variant rotation of a desired angular velocity.

2. Control Algorithm

Figure 4:
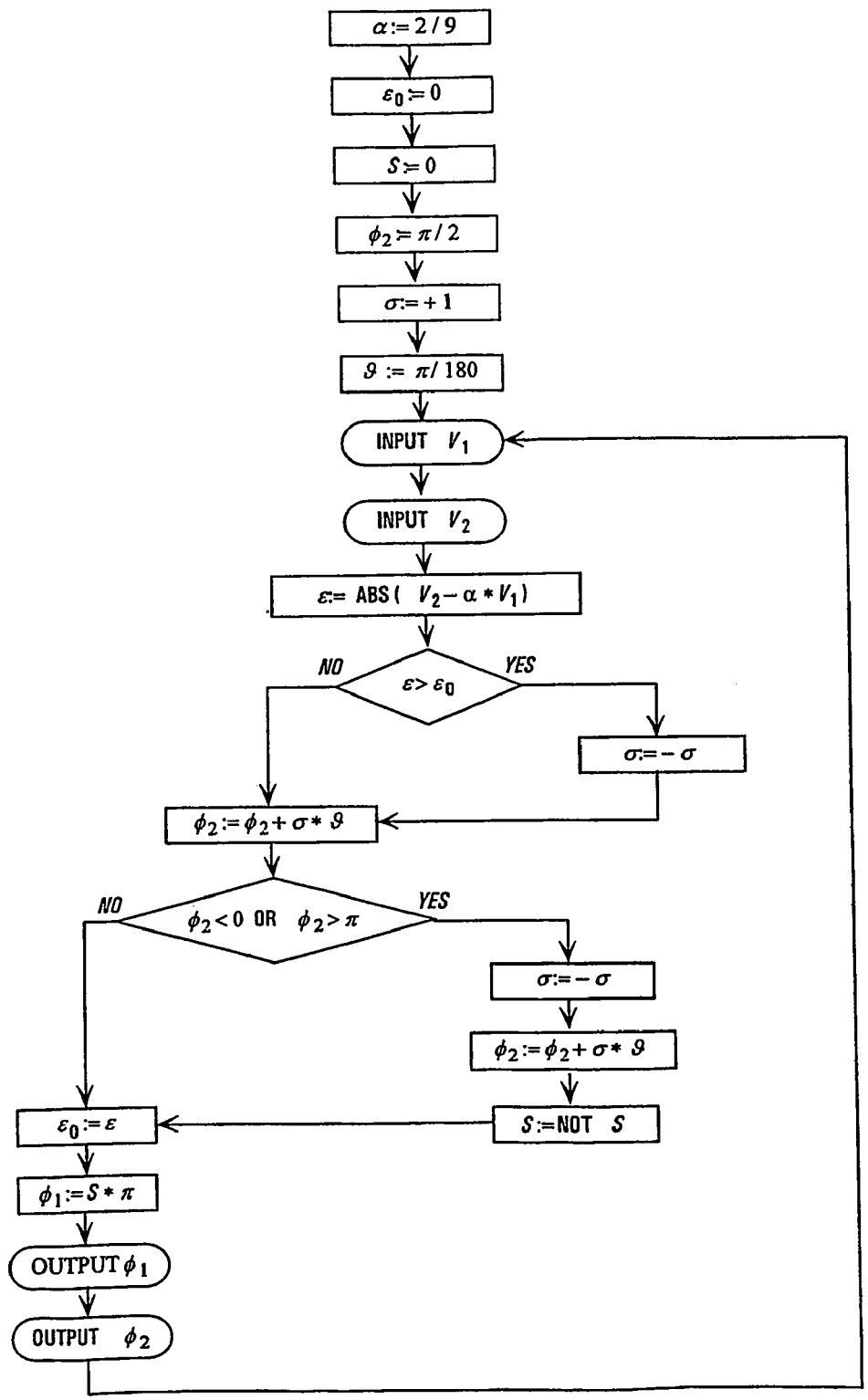
FIG. 4. Flow chart of a control algorithm for the single-stage polarization stabilizer.

FIG. 4 is a flow diagram of the control algorithm used in the first embodiment for realizing the above-described optimization strategy for achieving polarization stabilization. The control algorithm is simple cyclic control algorithm that can be implemented on a digital PC-based controller, or any other suitable hardware, firmware, software or combination thereof. An all-optical processor could also be used for the controller.

At each control period or step the signal control $\Phi_2$ of the phase retardation of VR2 is changed by a quantity of constant absolute value $\partial$, referred to as the step angle. If the error becomes larger than the error at the previous step, then the sign of the retardation variation is changed, else the sign is not changed. The signal control $\Phi_1$ of the phase retardation of VR1 is kept constant as long as $\Phi_2$ is not a limit of the range [0,$\pi$]. If the value $\Phi_2$ has reached a range limit and the sign of the phase retardation would lead $\Phi_2$ outside of the range, then the value of $\Phi_2$ is not changed at the successive step, whilst the variation sign is inverted and the value of $\Phi_1$ is commuted between 0 and $\pi$.

More precisely the control algorithm that has been implemented, consists of the following algorithm steps:
1. assignment of the constant $\alpha$, depending on the behavior of the optical components;
2. initialization to zero of the error at the previous step $\epsilon_0$;
3. initialization of the Boolean value S that can assume only the values 0 or 1, corresponding to the commutation state of the first retarder element;
4. initialization of the control signal $\Phi_2$ of the second retarder element retardation to the value $\pi/2$;
5. initialization of the variation sign $\sigma$ the phase retardation $\Phi_2$;
6. initialization of the absolute value $\partial$ (said step angle) of the variation of the phase retardation $\Phi_2$;
7. acquisition of $V_1$ from the first photodiode;
8. acquisition of $V_2$ from the second photodiode;
9. calculation of the current error $\epsilon$ as absolute value of $(V_2-\alpha V_1)$;
10. if the current error $\epsilon$ is greater than the previous error $\epsilon_0$ then:
    10.1. inversion of the variation sign $\sigma$,
11. variation of $\Phi_2$ by a quantity of absolute value $\partial$ and sign $\sigma$,
12. if $\Phi_2$ is not between 0 and $\pi$ then:
    12.1. inversion of the variation sign $\sigma$,
    12.2. variation of $\Phi_2$ by a quantity of absolute value $\partial$ and sign $\sigma$,
    12.3. negation of the Boolean state S, that means commutation of the state of the first retarder element;
13. assignment of the current error $\epsilon$ to the previous error $\epsilon_0$;
14. updating of $\Phi_1$ as product between S and $\pi$,
15. output of the first control signal $\Phi_1$;
16. output of the first control signal $\Phi_2$;
17. return to algorithm step 7.

The flow chart of this algorithm, assuming the values $\alpha=2/9$ and $\partial=\pi/180$ radians, is shown in FIG. 4. Clearly, different step angle sizes $\partial$ can be chosen, depending on the circumstances, for example the specification of the retarder elements and the desired response of the device. Similarly, different devices may have different values for the parameter $\alpha$ For devices according to the first embodiment, the target value for the stabilized output power, as a fraction of the maximum output power obtainable in open loop by varying the input SOP, will be assigned a non-zero value of less than one-half, one-half being the maximum possible value for the first embodiment device (algorithm step 1 above). Typically the parameter $\alpha$ will be set between 0.1 and 0.4 in the first embodiment device, for example at 2/9, as in the specific example.

In general, the smaller the step size, the better the stabilization. In order to have a relative error in the output power of less then 5%, the step angle should be less than 1 degree, assuming a misalignment specification of the variable retarders and PBS of less than ±0.25 degrees. In order to have a relative error in the output power of less then 10%, the step angle needs to be less than 2 degrees, assuming a specified tolerance for the relative orientation between each variable retarder and the PBS of ±0.5 degrees. It is thus preferred that the step size is less than 2 degrees, more preferably less than 1 degree.

3. Experimental Results

Figure 5:
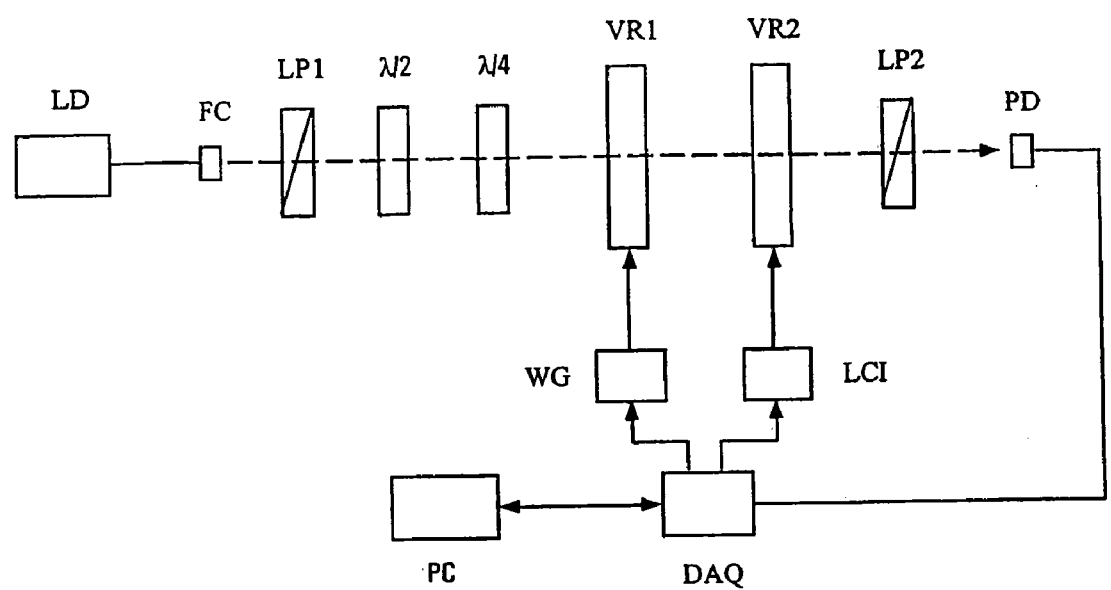
FIG. 5. Experimental set-up of an example of the single-stage polarization stabilizer including first and second variable retarders.

FIG. 5 shows an experimental test apparatus used to test the effectiveness of the above-described polarization stabilization procedure as applied to a device according to the first embodiment. As will be understood from the following, this test apparatus is not an example of a complete device according to the first embodiment, but rather is designed to experimentally verify that a device according to the first embodiment will successfully operate as predicted.

To generate an input optical signal of varying SOP, a pigtailed laser diode LD emitting at 1550 nm is provided, its output being collimated by means of a fiber collimator FC which outputs a collimated free-space beam. The SOP of the beam is then varied by passing it through a linear polarizer LP1, a half-wave plate λ/2 and a quarter-wave plate λ/4. The beam SOP is changed by changing the orientation of the half-wave plate and the quarter-wave plate.

It can thus be considered in the test apparatus of FIG. 5 that the components LD, FC, LP1, λ/2 and λ/4 collectively serve to generate the input optical beam of the first embodiment (i.e. the input signal to the device of first embodiment).

The thus generated beam is then passed through first and second phase retarder elements VR1 and VR2, which are directly analogous to the same components in the device of the first embodiment In the test apparatus, the two retarders are two nematic liquid-crystal cells with variable retardation (model LRC-100-IR3 produced by Meadowlark Optics Inc.). Each liquid crystal retarder is electrically driven by an AC square wave at 2 kHz, with 50% duty cycle and zero DC bias. The value of the phase retardation decreases as the peak voltage of the applied square wave increases. A retardation of π radians corresponds to a peak voltage of about 1.4 V and a retardation of 0 corresponds to a peak voltage of about 6.0 V.

After traversing the retarders VR1 and VR2, the beam goes through a linear polarizer LP2 and the optical power is detected by a photodiode PD. The photodiode used was a New Focus, Inc. Model 1811 low noise photoreceiver.

This combination of LP2 and PD mimics the branch-off from the polarizing beam splitter PBS to the PD2 at the output of the device of the first embodiment, in that it measures the optical power contained in one linear output polarization after the beam has traversed the two retarders.

The electrical signal $V_{out}$ from the photodiode PD is acquired by a digital acquisition board DAQ. The DAQ board is a PCI-MIO-16E-4 produced by National Instruments. The DAQ board is connected to a personal computer PC that executes a LabVIEW (trademark) application implementing a slightly simplified version of the control algorithm described above with reference to FIG. 4.

In the simplified version implemented in the test apparatus there is acquired at each control period only the signal $V_{out}$ and the error is defined as $\epsilon = |V_{out} - V_{ref}|$, where $V_{ref}$ is set via PC as half of the maximum output power obtainable in open loop by varying the SOP.

This simplification of the control algorithm is valid to test the principles of the proposed stabilization control, since it follows from the absence in the test apparatus of input stage components corresponding to the input side beam splitter BS and photodetector PD1 in the first embodiment. The input stage components BS and PD1 in the first embodiment are provided to stabilize the power of the output optical beam in relation to fluctuations in the power of the input optical beam. They are thus not required if the power of the input optical beam can be held constant, as in the test apparatus.

A device generally according to the first embodiment, but with components BS and PD1 omitted is thus contemplated as an alternative embodiment.

Returning to the test apparatus, the control signal $\Phi_1$ is converted into an analog output of the DAQ board that modulates the amplitude of the square wave produced by a waveform generator WG. The square wave drives the first liquid crystal retarder VR1 which can adopt only the two values 6.0 V and 1.4 V, corresponding respectively to a phase retardation of 0 and π radians.

The control signal $\Phi_2$ is converted in a TTL compatible 8-bit digital output of the DAQ board. This digital signal is sent to the liquid crystal digital interface LCI, produced by Meadowlark Optics, Inc. (model D1040), that generates the square wave driving the second variable retarder VR2. The peak value of the generated square wave is the digital-to-analog conversion of the TTL compatible 16-bit input of LCI, using the complementary offset binary code with analog range 0-20 V. In the experiments only the 8 most significant bits of LCI input are controlled, since the DAQ board used can provide a digital output of maximum 8 bits. This results in a loss of peak voltage resolution that could, of course, be avoided by using a higher specification DAQ board.

The components PC, DAQ, WG and LCI of the test apparatus thus subsume the functions of the controller CTRLR in the first embodiment.

In order to verify the polarization stabilization through the feed-back action controlling the phase retardation of VR1 and VR2, the SOP of the beam incident on VR1, i.e. the input SOP, was made to change and the optical power transmitted by the output fixed polarizer LP2 was measured.

First, the behavior of the polarization stabilizer in response of an input elliptical SOP with fixed axes and periodically varying ellipticity was experimentally tested. A varying input SOP of this form was generated by rotating the λ/2 plate at constant angular velocity and keeping the λ/4 plate static. The axes of the input elliptical SOP are parallel to the eigenaxes of the λ/4 plate, oriented at ±45° with respect to the eigenaxes of VR2.

Figure 6:
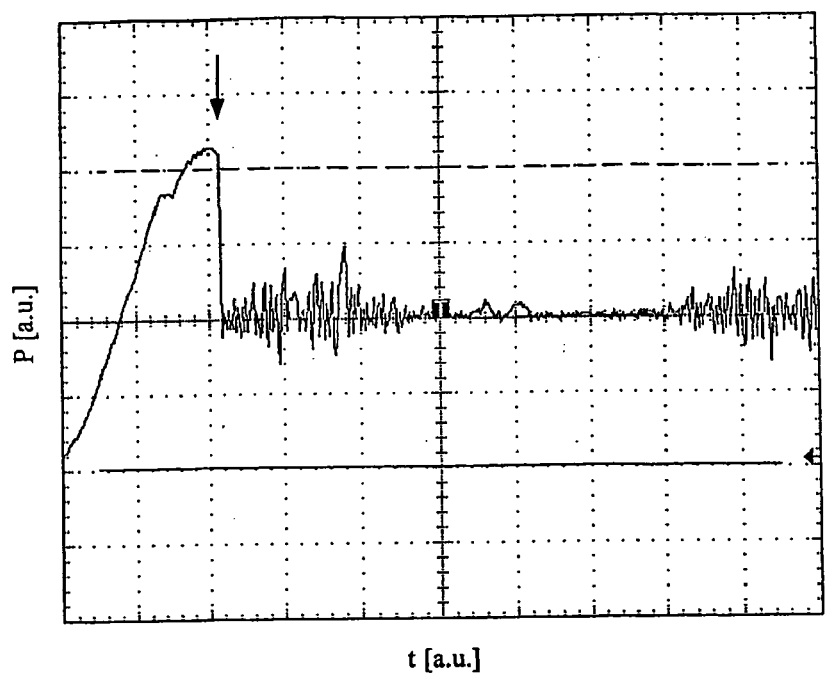
FIG. 6. Experimental behavior of the single-stage polarization stabilizer in response to an input SOP with periodically varying ellipticity.

FIG. 6 shows the measured output optical power 'P' in arbitrary units as a function of time 't' for this test using an input SOP with periodically varying ellipticity. The test was commenced with the feedback control switched off, the control being switched on at the point in time marked by the downward pointing arrow, which thus indicates the transition from an open-loop to a closed-loop regime in which the feed-back should act to stabilize the output power. As described above, in order to compensate the variation of the input SOP, the retardation of VR2 is alternately varied in the range [0,π] by the control algorithm and when a range limit is reached then the retardation of VR1 is commuted. As is evident from the graph, the output power of the test apparatus stabilizes immediately after the closed-loop regime is entered, indicating that polarization stabilization is successfully being achieved for an input elliptical SOP.

There is however some noise associated with the stabilized signal, which is principally due to experimental limitations of the test apparatus, rather than any inherent limitation of the design principles, as now explained.

The noise oscillations around the mean power level are due to the limited resolution of VR2 phase retardation because only 8 bits of the 16-bit input of LCI are controlled. In other words, this noise merely reflects the limited specification of the test apparatus, and is not caused by any fundamental limitation of the operating principles. The phase retardation of the liquid crystal variable retarders used is also not linearly dependent on the peak voltage of the driving square wave. Instead, the function is more similar to an inverse form with retardance being proportional to the inverse of applied voltage. The precise graph of the retardance as function of the peak voltage applied to the liquid-crystal retarder VR2 is reported in Meadowlark Optics Inc., Test Part 00-153 relative to the liquid-crystal variable retarder LRC-100-IR3 (2000). In particular, the absolute value of the derivative of the phase retardation with respect to the peak voltage is not constant in the phase range $[0,\pi]$ with the retarder used. The derivative assumes a maximum value of about 3 radians/V for a phase retardation equal to $\pi$ radians and a minimum value of about 0.07 radians/V for a phase retardation equal to 0. The peak voltage resolution of the square wave generated by LCI is about 40 mV, therefore the step angle varies approximately in the range from 0.20 to 70 as the phase retardation of VR2 varies from 0 to $\pi$ radians. Moreover the amplitude of the oscillations in closed-loop around the mean power level is an increasing function of the step angle. This explains why the amplitude of the noise in the closed-loop oscillations has a periodicity in response to the elliptical input SOP (two peaks in this noise are evident in FIG. 6). This is because the feedback control is less accurate when the retarder VR2 is operating at low voltages VR2 at which one voltage increment of the DAQ board causes a much larger retardation increment in the retarder VR2 than at higher voltages.

A second test was also performed in which the behavior of the polarization stabilizer was studied in response of a rotating linear input SOP. This was performed by removing the quarter wave plate $\lambda/4$ from the set-up of FIG. 5 and rotating the half wave plate $\lambda/2$ with a constant angular velocity.

Figure 7:
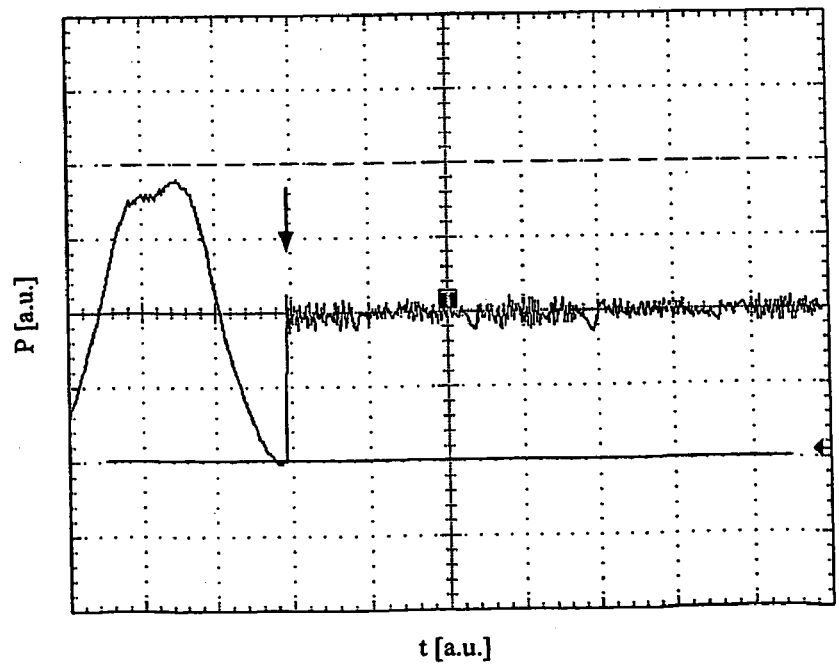
FIG. 7. Experimental behavior of the single-stage polarization stabilizer in response to an input linear SOP with rotating orientation.

FIG. 7 shows the measured output optical power 'P' in arbitrary units as a function of time 't'. The test was commenced with the feedback control switched off, the control being switched on at the point in time marked by the downward pointing arrow, which thus indicates the transition from an open-loop to a closed-loop regime in which the feed-back should act to stabilize the output power. In this test, stabilization is obtained with phase retardation of VR2 around $\pi/2$ radians The absolute value of the derivative of the phase retardation with respect to the peak voltage for a retardation equal to $\pi/2$ radians is about 1.5 radians/V. In this experimental test the step angle has an approximately constant value of 4°. As expected the closed-loop noise oscillations shown in FIG. 7 have about a constant amplitude with time, and are stabilized at a lower level than for the test of FIG. 6 with an input of periodically varying elliptical SOP.

4. General Discussion of Retarder Design

In general any physical mechanism producing a birefringence with fixed eigenstates and controllable phase retardation can be exploited to realize the polarization stabilizer based on the above described principles. In addition to the solution exploiting nematic liquid-crystal retarders, one or both of the variable retarders can be realized using electro-optic crystals. In particular, due to the requirement of both optical isotropy in the absence of externally applied electric field and electrically tunable birefringence with eigenaxes independent of the value of the applied electric field, electro-optic crystals belonging to the symmetry point group $\bar{4}3m$ can be used. Crystals showing this symmetry, which is often referred to as zincblende, include a variety of II-VI and III-V compounds such as zinc sulfide (ZnS) with its ternary or higher order compounds (e.g. ZnSSe); cadmium telluride (CdTe) with its ternary or higher order compounds (e.g. CdZnTe); gallium arsenide (GaAs) with its ternary or higher order compounds (e.g. AlGaAs, InGaAsP); and many others. The phase retardation between the birefringence eigenstates propagating in a crystal of length L, induced by applying a voltage V between two transverse electrodes separated by a distance d, is $$\phi = \frac{2\pi}{\lambda} n^3 r_{41} V \frac{L}{d}, \quad (1)$$

where $\lambda$ is the wavelength, it is the index of refraction and $r_{41}$ is the Pockels coefficient depending on the material [14]. The half-wave voltage $V_\pi$ is defined as the voltage that induces a phase retardation of $\pi$ radians. From Eq. (1) it can then be deduced that:

$$V_\pi = \frac{\lambda}{2n^3 r_{41}} \frac{d}{L}. \quad (2)$$

Figure 8:
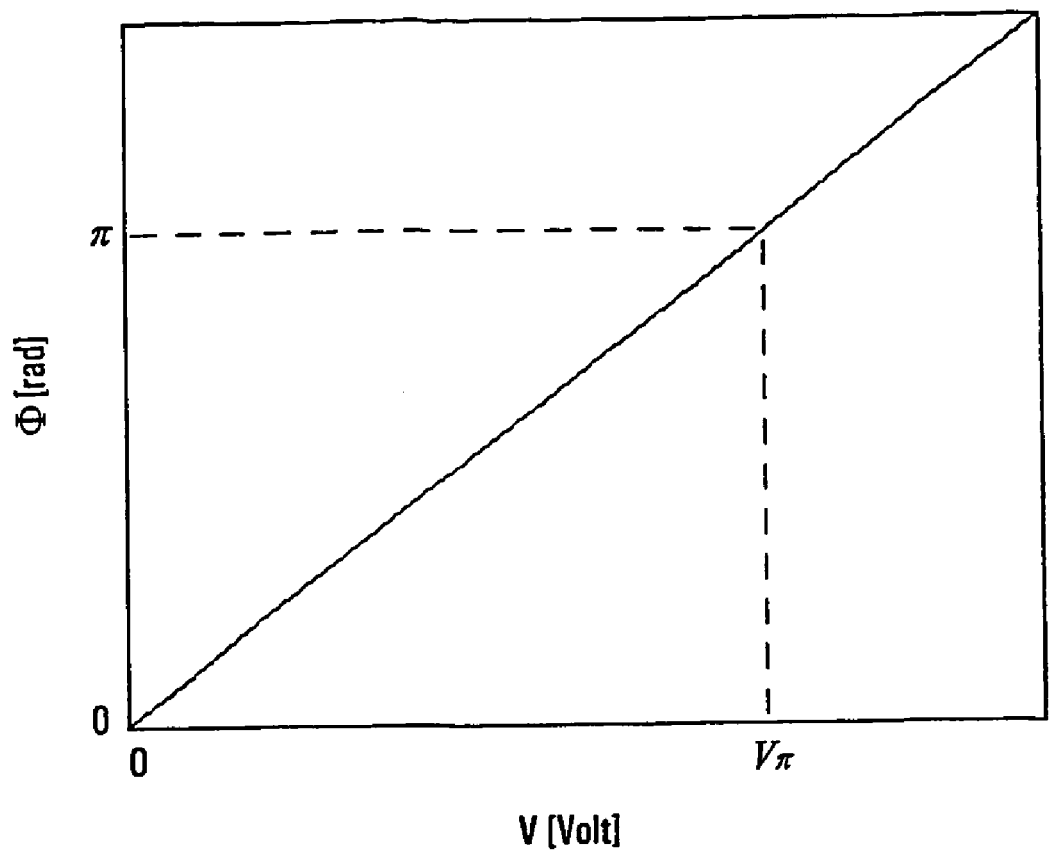
FIG. 8. Graph of phase retardation as a function of voltage for an electro-optic crystal used in the variable retarders of the single-stage polarization stabilizer.

The Equation (1) expresses a linear relation between the phase retardation $\phi$ and the applied voltage V, as illustrated by the graph of FIG. 8.

The retarders can also be made from so-called 'squeezers', which are elements with phase retardation that depend on the applied stress through the elasto-optic effect.

5. Numerical Simulations

The performance of the polarization stabilizer has also been tested with numerical simulations realized by a program implemented in Matlab (trademark). The beam SOP is described by means of the Stokes vector [13]. At the beginning of each control period of the program the Stokes vector of the input beam SOP is updated, in order to simulate the input SOP at successive instants. Then the Stokes vector transmitted by the cascade of VR1 and VR2 is calculated using the respective Müller matrices [13]. More precisely the action of the birefringent elements VR1 and VR2 on the optical beam (see FIG. 1) is calculated by multiplying the corresponding Müller matrix by the Stokes vector of the incident beam, obtaining the Stokes vector of the transmitted beam. This Stokes vector is assumed to be normalized, that is the first parameter is set equal to one. The fraction of the optical power reflected by the PBS is the first parameter of the Stokes vector resulting from the Müller matrix of a linear polarizer in the SOP reflected by the PBS, multiplied by the Stokes vector of the incident beam on the PBS. At the end of each control period the phase retardations of VR1 and VR2 are determined according to the control procedure described above with reference to FIG. 4, and the corresponding Müller matrices are calculated. The error defined in this control procedure is zero when the fraction of the optical power reflected by the PBS is equal to one half. Then the program goes to the next control period, updates the input Stokes vector and calculates the action of the Müller matrices of VR1 and VR2 determined in the previous control period.

Figure 9:
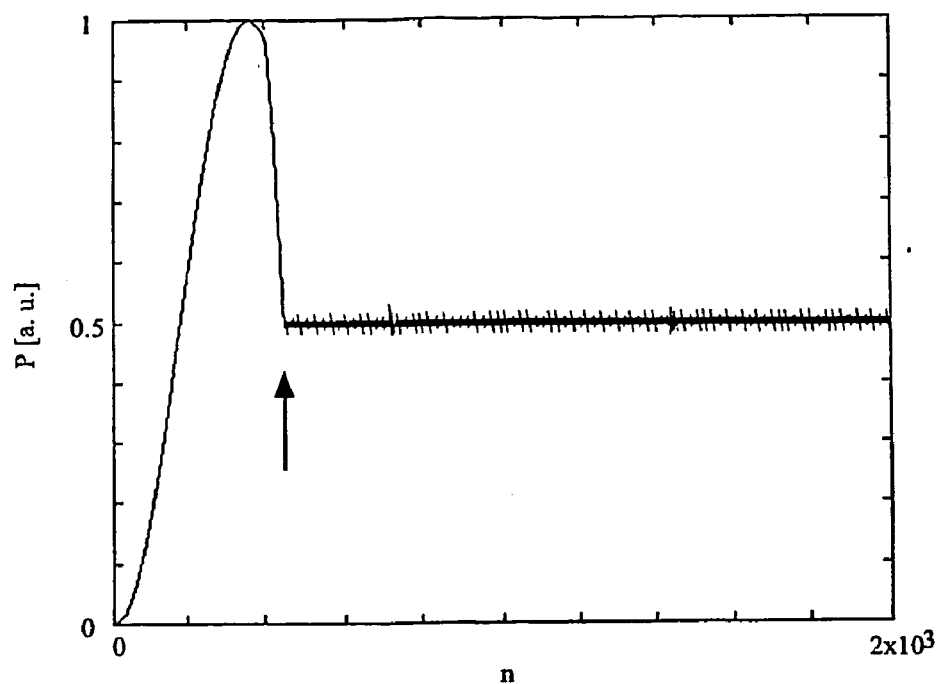
FIG. 9. Simulated behavior of the single-stage polarization stabilizer in response to an input SOP with periodically varying ellipticity.

FIG. 9 shows a simulation of the output power 'P' in arbitrary units as a function of the control period number 'n' in case of the same input SOP variation considered in the experiment producing the result illustrated by FIG. 6. The feedback is activated at the point in time shown by the vertical arrow. The step angle in this simulation is equal to 1° and the small spikes are due to the commutation of VR1 phase retardation.

Figure 10:
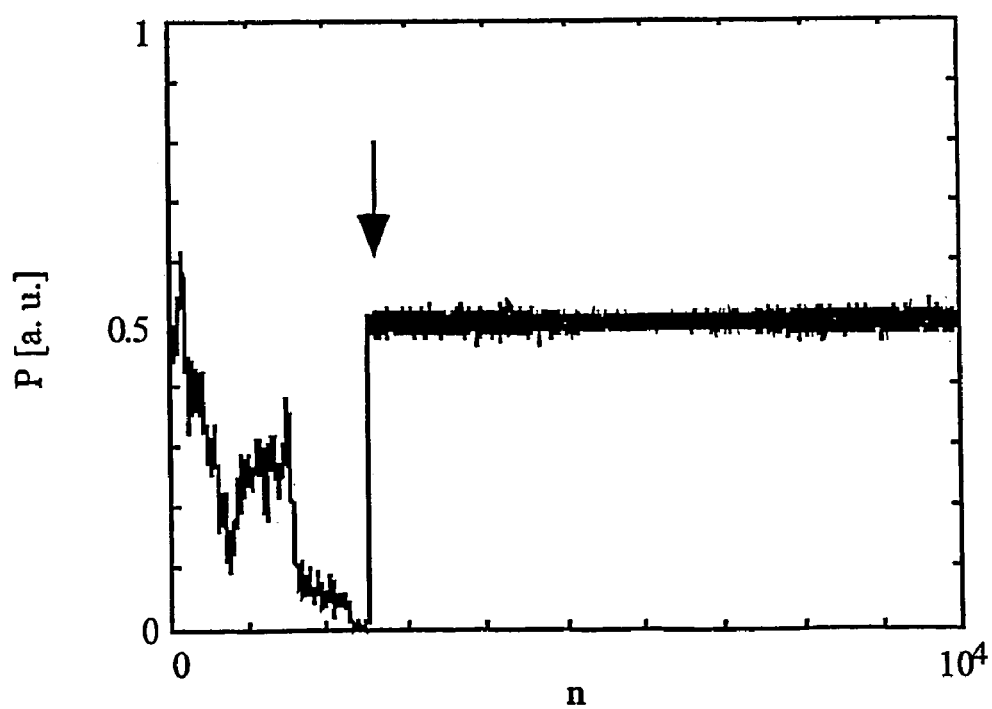
FIG. 10. Simulated behavior of the single-stage polarization stabilizer in response to a randomly fluctuating input SOP.

FIG. 10 shows the result of a simulation in case of an input SOP that is randomly fluctuating, still pointing out the start of the feed-back stabilizing action. Power 'P' is plotted against control period number 'n' as in the previous graph. The feedback is activated at the point in time shown by the vertical arrow. The latitude and longitude fluctuations of the input SOP representative point on the Poincaré sphere [13] are considered at each control period of the simulation as independent random variables with zero mean and standard deviation of 0.5°. The step angle is equal to 1°.

The simulations thus further confirm that the proposed polarization stabilization method operates successfully.

6. Second Embodiment: Two-stage Configuration

As will be understood from the above, the single-stage polarization stabilizer of the first embodiment has an intrinsic loss of 3 dB. In other words, in perfect lossless operation, the polarization stabilized output optical beam can never exceed half the power of the input optical beam. A second embodiment is now described which has no intrinsic loss. In other words, in perfect lossless operation, the polarization stabilized output optical beam can potentially have up to the full power of the input optical beam.

Figure 11:
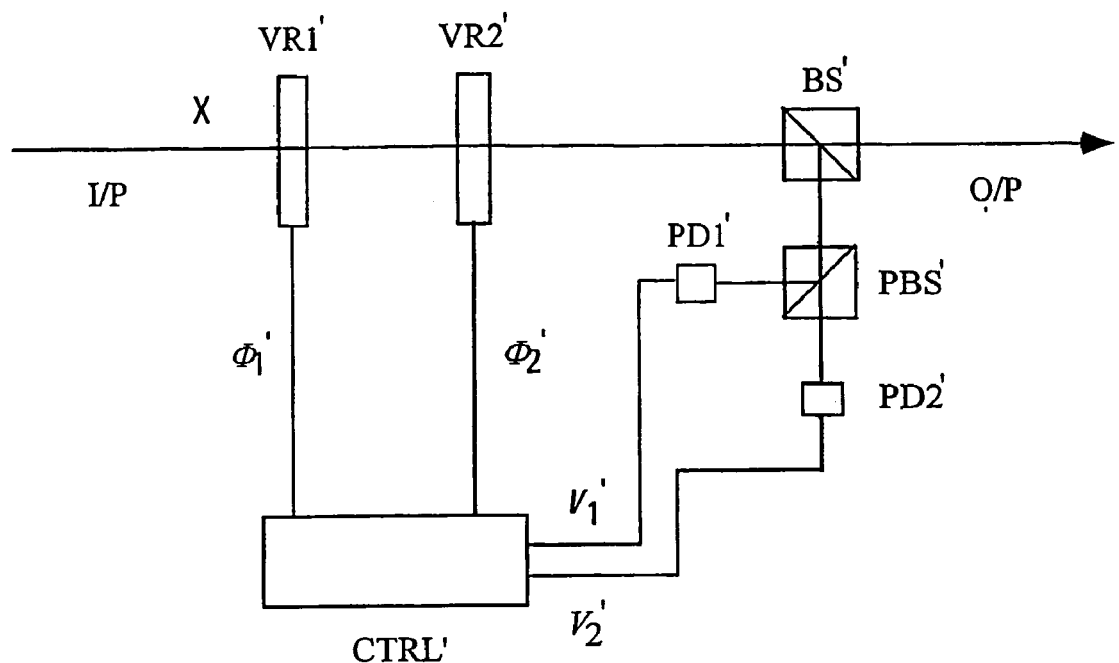
FIG. 11. Schematic drawing of a first stage of a two-stage polarization stabilizer according to a second embodiment.
Figure 12:
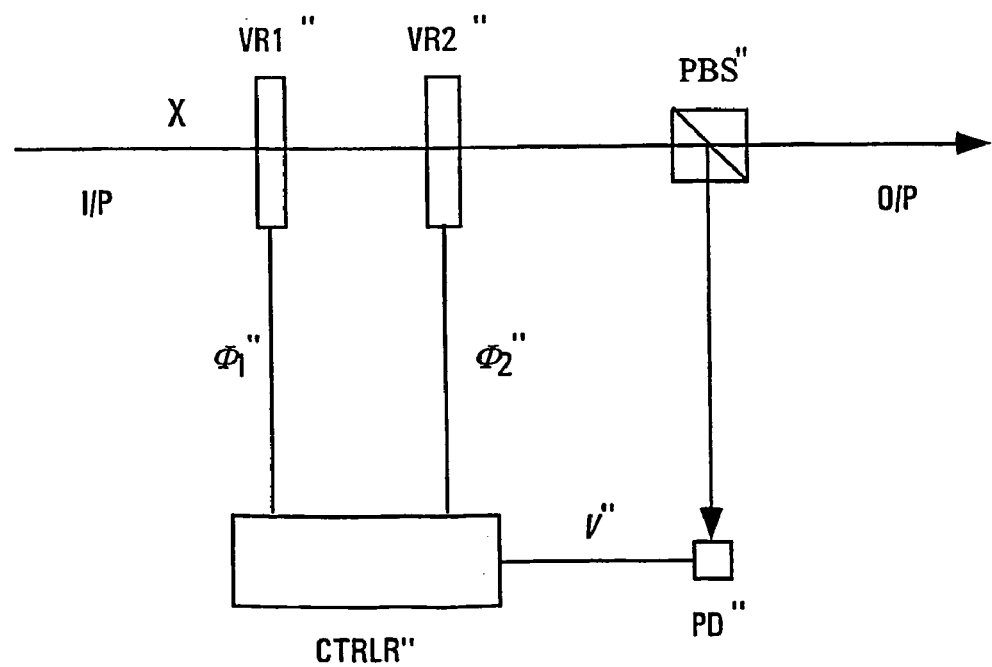
FIG. 12. Schematic drawing of a second stage of the two-stage polarization stabilizer.

FIGS. 11 and 12 show first and second stages of the device of the second embodiment. In the figures, the input and output optical beams from each stage are labeled I/P and O/P respectively. Each stage is approximately comparable to the first embodiment device with the output optical beam from the first stage being supplied to the second stage as its input optical beam.

Referring to FIG. 11, the first stage comprises first and second variable retarders VR1' and VR2' which are linearly birefringent elements with fixed eigenaxes and controllable phase retardation, as in the first embodiment. The retarders VR1' and VR2' are arranged along a principal optical axis 'x' of the device which constitutes the main beam path of the device. A polarization insensitive beam splitter BS' is arranged on the output side of the first stage after the second retarder VR' to divert a portion of the beam out of the main beam path 'x'. For minimum losses, the diverted portion of the signal should be vanishingly small. However, in practice, the diverted portion needs to be large enough to provide a reasonable signal-to-noise ratio for subsequent processing associated with the control loop. A diverted power fraction of between 1-10% may be typical. For example, a beam splitter BS' with a 90/10 splitting ratio may be used. The diverted portion of the beam is then received by a polarizing beam splitter PBS' which splits the diverted beam portion into its two orthogonal polarization components, which are supplied to respective photodiodes PD1' and PD2'. The polarizing beam splitter PBS' is disposed so that ideally the incident beam is totally reflected or transmitted in correspondence of a linear output SOP coincident respectively with the fast or the slow eigenstate of VR1'. The photodiodes PD1' and PD2' supply respective signals $V_1$' and $V_2$' as input signals to a controller CTRLR'.

It will be appreciated that these signals are in electronic form, with the photodiodes being optoelectronic converters. However, it will also be appreciated that these processing elements could be embodied with all-optical components of the same functionality. This may be desirable for stabilizing extremely high frequency polarization instabilities where all-optical power sensing and control processing could be performed. These comments also apply to the first embodiment, and to the second stage of the second embodiment.

The controller CTRLR' has first and second outputs connected to the first and second retarders VR1' and VR2' respectively which carry output signals for setting the phase retardation on the retarders to the desired values $\Phi_1$' and $\Phi_2$'.

The first stage thus contains two linearly birefringent elements with fixed eigenaxes and controllable phase retardation. The first birefringent element VR1' assumes only the retardation values 0 and $\pi$ radians, while the second element VR2' has a retardation varying in the range from 0 to $\pi$ radians. The eigenaxes of the first element VR1' are oriented at ±45° with respect to the eigenaxes of the second one. The eigenaxes of the first element VR1" of the second stage are oriented at ±45° with respect to the eigenaxes of the first birefringent element VR1' of the first stage. The polarizing beam splitter PBS" is oriented so as to pass a SOP coincident with the fast or slow eigenstate of the first element of the second stage VR1", i.e. to pass a SOP that is oriented at 0° or 90° with respect to the eigenaxes of VR1".

Referring to FIG. 12, the second stage comprises first and second variable retarders VR1" and VR2" which are linearly birefringent elements with fixed eigenaxes and controllable phase retardation. The first and second variable retarders VR1" and VR2" have respective eigenaxes oriented at approximately ±45 degrees relative to each other.

The retarders VR1" and VR2" are arranged along the principal optical axis 'x' of the device so as to receive the output optical beam from the first stage.

A polarizing beam splitter PBS" is arranged on the output side of the second stage after the second retarder VR2" to extract a portion of the optical beam and direct it to a photodiode PD", which serves to measure the power of this extracted portion. The polarizing beam splitter PBS" is oriented with its azimuth extending at approximately 0 or 90 degrees to the eigenaxes of the first variable retarder VR1".

The beam transmitted by the PBS" is the linearly polarized output optical beam of the device. The photodiode PD" provides an electrical signal V" that is sent to an input of the electronic controller CTRLR" that generates as outputs, responsive to the input signal V", the control signals $\Phi_1$" and $\Phi_2$" for setting the retarders VR1"and VR2" to the appropriate phase retardation values.

The controller CTRLR" has first and second outputs connected to the first and second retarders VR1" and VR2" respectively which carry output signals for setting the phase retardation on the retarders to the desired values $\Phi_1$" and $\Phi_2$".

The second stage thus contains two linearly birefringent elements with fixed eigenaxes and controllable phase retardation. The controller CTRLR" is operable to ensure that the first birefringent element VR1" assumes only the retardation values 0 and $\pi$ radians, while the second element VR2" has a retardation varying in the range from 0 to $\pi$ radians. The eigenaxes of the second element VR2" are oriented at ±45° with respect to the eigenaxes of the first element VR1". Moreover, the PBS" has its azimuth oriented at 0° or 90° relative to the eigenaxes of the first element VR1".

Notwithstanding their structural similarities, the two stages have different functions for stabilizing the polarization of the input optical beam, as now described.

Each stage is controlled independently by an algorithm based on that of FIG. 4, that is by the algorithm used for the single-stage configuration of the first embodiment. Referring to the above text describing FIG. 4, the algorithm used for the first stage of the second embodiment is mathematically the same as that used for the first embodiment, wherein, in step 9, the current error is the absolute value of $V_2'-\alpha V_1'$, that is $\epsilon'=|V_2'-\alpha V_1'|$. These voltage values have different physical origins than the corresponding values in the first embodiment, but the error calculation is of the same mathematical form. In respect of the second stage, the only difference is that in step 9 the current error is the absolute value of V".

The fact that each stage is controlled independently of the other is highly advantageous, since the provision of two stages does not lead to any additional complexity to the control, since no time synchronization between the first and second stage controllers CTRLR' and CTRLR" is required. A very simple control algorithm based on that of FIG. 4 can be applied to both stages. (As already explained the respective algorithms differ only in the error calculation.)

Separate controllers are shown for the two stages, consistent with their functional independence from one another. However, it will be understood that the two controllers could be embodied in a single hardware, firmware or software unit.

The function of the first stage is to transform any input SOP into an elliptical output SOP with axes parallel to the eigenaxes of the second birefringent element VR2'. Furthermore the first stage sets the output power to a value that is independent of the input SOP. The two signals $\Phi_1'$ and $\Phi_2'$ controlling the phase retardations respectively of VR1' and VR2' are generated by the controller CTRLR' that executes the algorithm described above with reference to FIG. 4. The constant α, defined in the control algorithm, is fixed so that the error $\epsilon'=|V_2'-\alpha V_1'|$ is ideally zero when the input SOP has components on the eigenstates of VR1' with equal optical power. This condition is equivalent to having an elliptical output SOP with axes parallel to the eigenaxes of VR2'. For example, considering an ideal PBS' 50/50 and photodiodes PD1', PD2' of equal responsivities, the constant α should have the value 1.

The elliptical SOP with fixed axes, obtained as output of the first stage, is then transformed by the second stage into a fixed linear SOP with optical power independent of the input SOP. The two birefringent elements VR1" and VR2" with controllable phase retardation are followed by the polarization beam splitter PBS". The optical power of the beam reflected by the PBS" is measured by the photodiode PD", obtaining the electric signal V" sent to the controller CTRLR". In this second stage there is only one photodiode. The controller CTRLR" executes the same control algorithm as the first stage, with the exception that the error is defined as $\epsilon''=|V''|$. The aim of the feed-back is to set this error to zero. This is equivalent to a polarization stabilization in the linear SOP totally transmitted by PBS". In the two-stage stabilizer the linear output SOP transmitted by PBS" is identical to either of the eigenstates of VR1". Moreover, the eigenstates of the first element of the second stage VR1" are the same as the eigenstates of the second element of the first stage VR2'.

It is noted that the device of the second embodiment may also be used as an attenuator with built-in polarization stabilization, for example as an input stage to a polarization sensitive amplifier such as a semiconductor optical amplifier (SOA).

It is also noted that the first stage device of FIG. 11 can be used as a stand-alone device performing the same function as the device of the first embodiment, if an element transmitting only the linearly polarized component, e.g. a linear polarizer, is arranged in the output beam path, with the component having its azimuth parallel to the azimuth of an eigenaxis of the first variable retarder VR1'. (Alternatively, a perpendicular alignment could be used.)

FIGS. 13 and 14a-14d are now referred to to explain the principles of operation of this two-stage polarization stabilizer in terms of a Poincaré sphere representation. The representative point of the first stage output SOP is kept by the feed-back on the great circle including L and Q, indicated by Γ in FIG. 13. The control procedure of the phase retardations $\Phi_1'$ and $\Phi_2'$ of the variable retarders of this first stage is identical to the previously described control procedure of the phase retardations in the single-stage configuration. Then the second stage, by controlling the phase retardations $\Phi_1''$ and $\Phi_2''$, moves the incident SOP, represented by a point which belongs to the great circle Γ, into the output linear SOP with azimuth η=45°, corresponding to the point Q. The control procedure of the second stage can be illustrated in case of incident SOP variation represented by an uniform rotation on the great circle Γ.

FIGS. 14a-14d represent the evolution of the SOP through the retarders of this second stage at four different instants, by showing the projection of the Poincaré sphere onto the plane including the great circle Γ. The points $P_0$, $P_1$ and $P_{out}$ represent respectively the incident SOP, the SOP transmitted by the first retarder, and the SOP transmitted by the second retarder of the second stage, that is the output SOP.

Figure 14A:
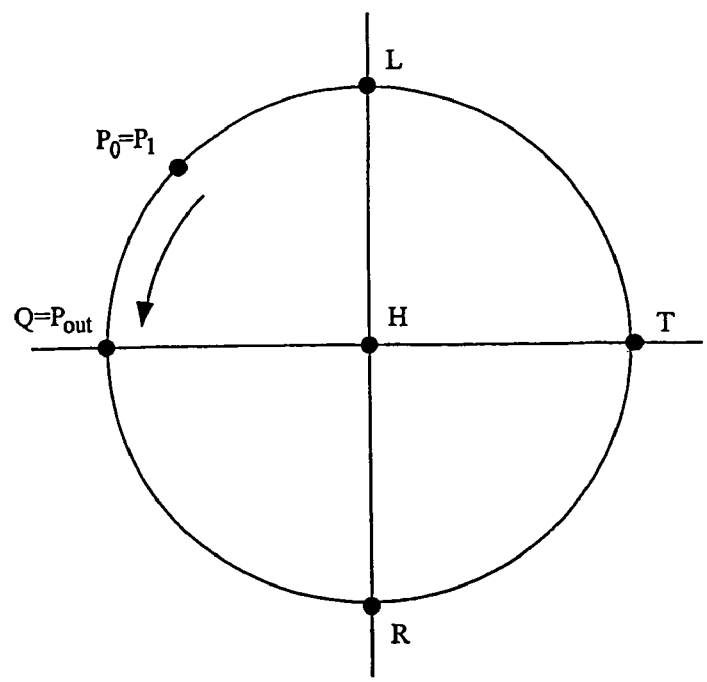
FIG. 14a. Transformation of the SOP representative point on the Poincaré sphere in the propagation through the second stage of the two-stage polarization stabilizer, for $\Phi_1''=0$ and $\Phi_2''=\pi/4$.
Figure 14B:
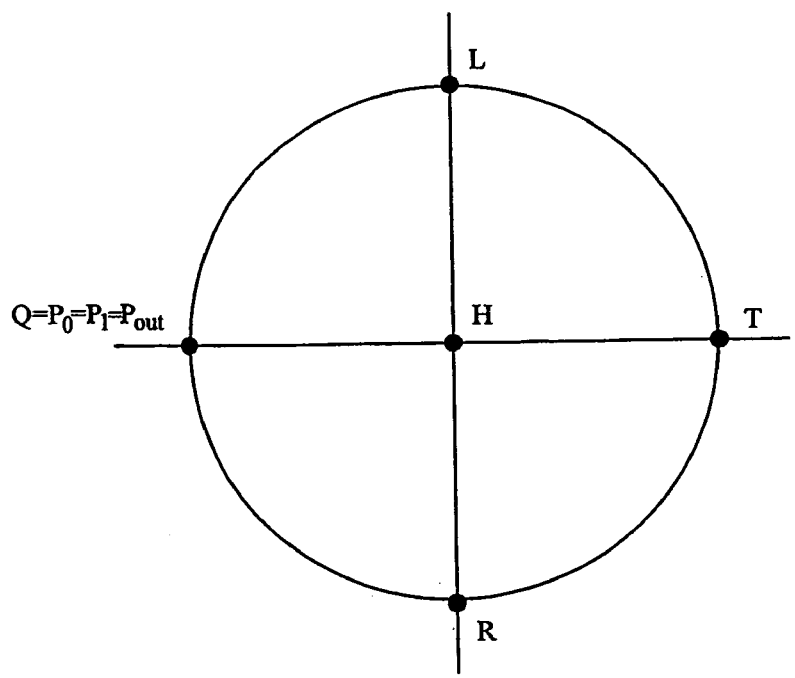
FIG. 14b. Transformation of the SOP representative point on the Poincaré sphere in the propagation through the second stage of the two-stage polarization stabilizer, for $\Phi_1''=0$ and $\Phi_2''=0$.
Figure 14C:
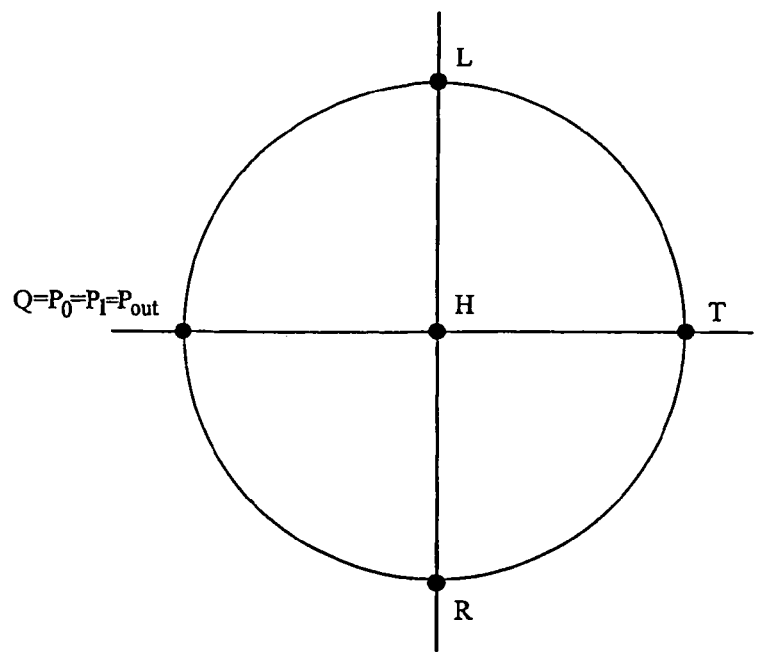
FIG. 14c. Transformation of the SOP representative point on the Poincaré sphere in the propagation through the second stage of the two-stage polarization stabilizer, for $\Phi_1''=\pi$ and $\Phi_2''=0$.
Figure 14D:
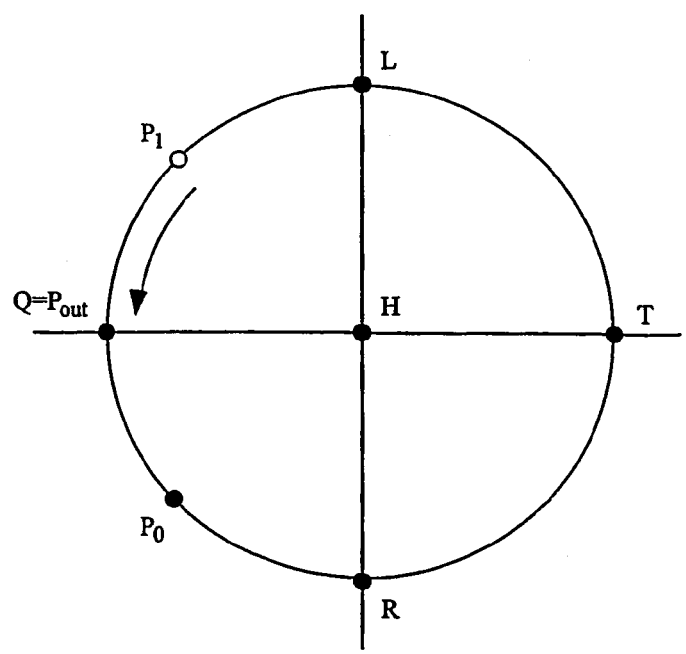
FIG. 14d. Transformation of the SOP representative point on the Poincaré sphere in the propagation through the second stage of the two-stage polarization stabilizer, for $\Phi_1''=\pi$ and $\Phi_2''=\pi/4$.

Initially (FIG. 14a) the point $P_0$ is transformed into the point $P_{out}$ by the action of the second retarder with phase retardation $\Phi_2''=\pi/4$, while the phase retardation of the first retarder is $\Phi_1''=0$. The successive rotation of $P_0$ on the great circle Γ is compensated by decreasing the phase retardation $\Phi_2''$ until it reaches zero when the point $P_0$ reaches the point Q (FIG. 14b). The further variation of $P_0$ can not be compensated for simply by decreasing $\Phi_2''$ because it has reached the lower limit. Therefore, in order to obtain an endless control, the phase retardation $\Phi_1''$ is commuted to π, while $\Phi_2''$ is kept equal to zero. During this commutation the output SOP is not appreciably perturbed, provided that the input SOP is nearly constant during the commutation, since the SOP incident on the second stage coincides with an eigenstate of the first retarder (FIG. 14c). Now the successive variation of $P_0$ is compensated by increasing $\Phi_2''$, while $\Phi_1''$ is kept equal to π (FIG. 14d). So the first stage transforms endlessly any input SOP in a SOP on the great circle Γ and then the second stage transforms endlessly this SOP in the output linear SOP represented by the point Q. When the phase retardation $\Phi_1'$ of the first retarder of the first stage is commuted, then the output SOP of the first stage is commuted between two orthogonal states represented by diametrically opposite points on the Poincaré sphere. Therefore the control speed of the second stage should be sufficiently fast to compensate for this SOP variation.

The tolerance of the device of the second embodiment to slight misalignments of the retarders and polarizers has been investigated. In order to have a relative error in the output power of less then 10%, the tolerance range for the relative orientation, of VR1', VR2', VR1", VR2" and PBS' with respect to the orientation of PBS" is ±2 degrees for a step angle of 8 degrees for both stages. It is thus preferred that the alignments of VR1', VR2', VR1", VR2" and PBS' with respect to the orientation of PBS" differ by less than 4 degrees, more preferably 2 degrees or 1 degree, and that the step angle of each controller is less than 10 degrees, more preferably 5 degrees, still more preferably 2 degrees.

7. Numerical Simulation of Second Embodiment

Figure 15:
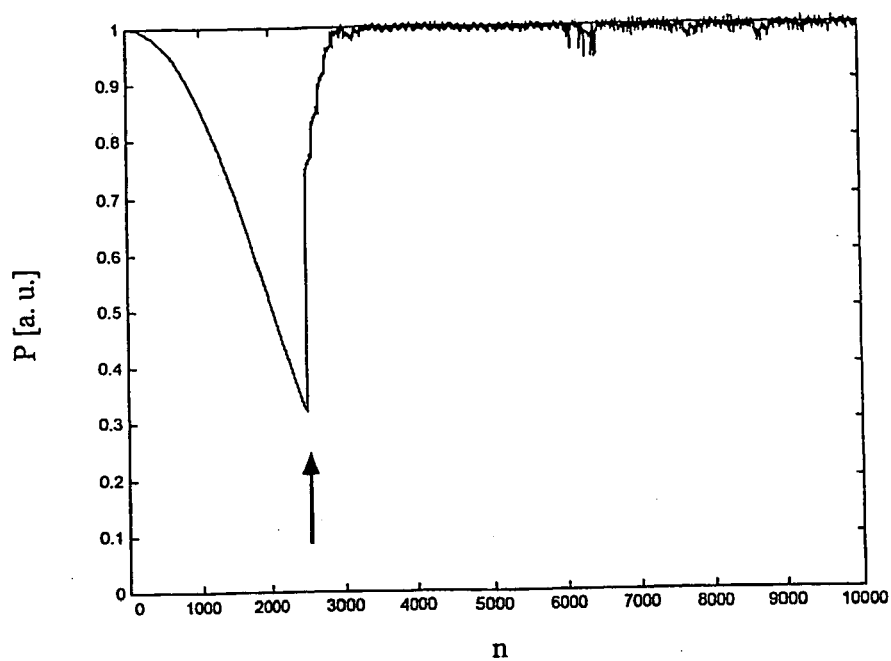
FIG. 15. Simulated behavior of the two-stage polarization stabilizer in response of a periodically varying input SOP.
Figure 13:
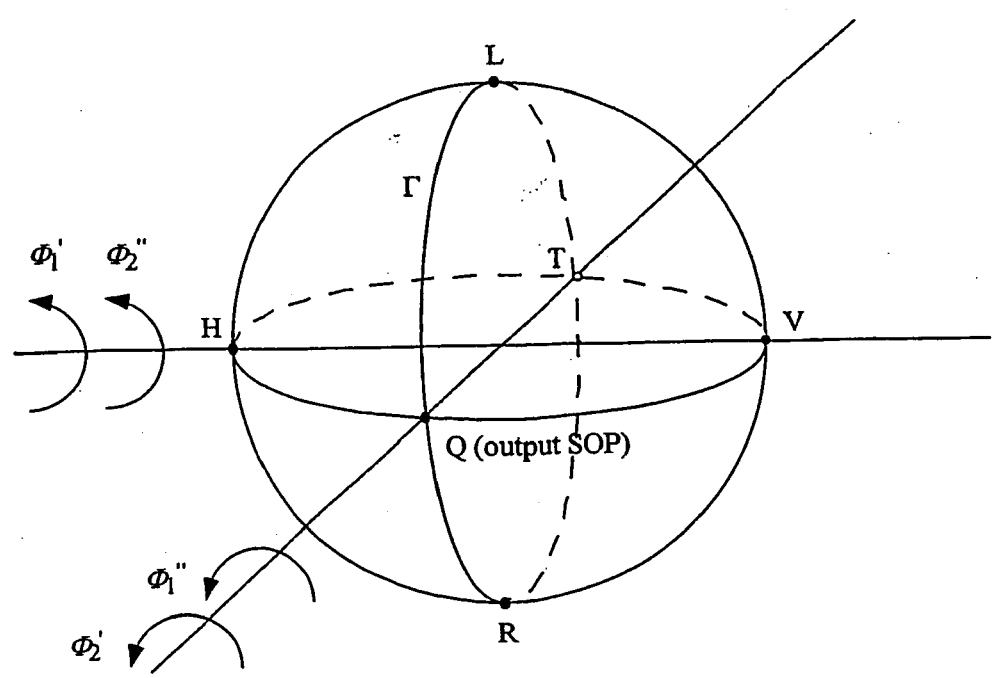
FIG. 13. Poincaré sphere representation of the two-stage polarization stabilizer.

FIG. 15 shows the simulated behavior of an example of the two-stage polarization stabilizer in response of a periodically varying input SOP. The simulation is a graph plotting output power 'P' in arbitrary units as a function of the control period number 'n'. The simulation is implemented as described in relation to the first embodiment using Matlab (trademark). The transition from the open-loop to the closed-loop regime is indicated with the upwardly pointing arrow. In this simulation the representative point of the input SOP, on the Poincaré sphere of FIG. 13, moves along the great circle including the points H and L. The first stage transforms the input SOP point into a point on the great circle Γ and then the second stage transforms this point into Q. In order to have an endless stabilization the phase retardation $\Phi_1'$ is periodically commuted and during this commutation the input SOP point of the second stage rotates of π radians along Γ. Such a movement is compensated by the second stage and the phase retardation $\Phi_2'$ is commuted. In the simulation the step angle is 8° and the commutation time of $\Phi_1'$ is 90 times the commutation time of $\Phi_2'$. Effective stabilization of the output power, implying corresponding stabilization of the output SOP, is evident in the closed-loop regime.

8. Generating Polarization Stabilized Outputs Other Than Linear SOPs

To generate a fixed elliptical output SOP, instead of a linear output SOP, it is sufficient to produce a fixed linear SOP as described above and then obtain an elliptical SOP with a half-wave plate followed by a quarter-wave plate, both fixed and suitably oriented. Another alternative is to add a rotating half-wave plate to transform a fixed linear SOP into a rotating linear SOP.

The single-stage configuration of the first embodiment can also be modified to obtain any fixed output elliptical SOP by substituting the PBS with an elliptical polarizer EP and the variable retarders VR1, VR2 with suitable elliptical variable retarders EVR1, EVR2. An elliptical polarizer is an optical element that transmits only the portion of the optical beam with the elliptical SOP defined by the polarizer. An elliptical variable retarder is an optical element with orthogonal elliptical eigenstates and with a variable phase retardation between the eigenstates. The previously referred to point P on the Poincaré sphere represents the output elliptical SOP transmitted by EP. The eigenaxes of the elliptical polarizer EVR1 are represented by P and the diametrically opposite point S. The eigenaxes of the elliptical polarizer EVR2 are represented by two diametrically opposite points F and G in order that the axis FG is orthogonal to axis PS. This generalized configuration is obtained from the configuration represented in FIG. 2 by a rotation of the Poincaré sphere that moves the points V,H, Q,T to the points P,S,F,G respectively.

A simple configuration obtainable by means of this rotation procedure of Poincaré sphere from FIG. 2 is the substitution of the variable retarder VR2 by a variable Faraday rotator.

The same generalization procedure applies to the two-stage configuration of the second embodiment. The linear polarizers PBS', PBS" are substituted by elliptical polarizers EP', EP". The variable retarders VR1', VR2', VR1", VR2" are substituted by elliptical variable retarders EVR1', EVR2', EVR", EVR2". This generalized configuration is obtained from the configuration represented in FIG. 13 by a rotation of the Poincaré sphere that moves the points V,H, Q,T to the points P,S,F,G respectively. The output SOP transmitted by EP" is represented by the point F. The SOPs separated by EP' are represented by the points P, S respectively. The eigenaxes of EVR2' and EVR1" are represented by the points F, G. The eigenaxes of EVR1' and EVR2" are represented by the points P, S. The axis FG is orthogonal to the axis PS.

Versions of the polarization stabilizers of the first and second embodiments modified in this way by using elliptical polarizers and elliptical variable retarders use the same control algorithms as described above. More specifically, the phase retardation of the second variable elliptical retarder of the stage (that is EVR2, EVR2', EVR2") is varied by the control procedure in the range from 0 to π radians. The phase retardation of the first variable elliptical retarder of the stage (that is EVR1, EVR1', EVR1") assumes only the two values 0 and π radians. The phase retardation is switched between 0 and π radians when the second variable retarder of the same stage reaches a range limit, in order to obtain an endless control.

A variable retarder with circular eigenstates is a polarization rotator, that is an element that rotates the azimuth of the SOP, one example of which is a Faraday rotator. If one applies the generalization procedure by rotating the Poincaré sphere of FIG. 2 by an angle of 90° around the axis VH, then the linear variable retarder VR2 is transformed into a circular variable retarder (realizable for example as variable Faraday rotator).

9. Conclusion

A feed-back procedure has been described that allows one to realize an endless polarization stabilizer. A single-stage configuration based on two variable retarders with finite birefringence range has been presented as a first embodiment. The endlessness is obtained by commuting the phase retardation of one retarder, when the retardation of the other retarder reaches a range limit. This configuration has an intrinsic theoretical loss of 3 dB and its effectiveness has been tested both numerically and experimentally. The experiments have been carried out using two nematic liquid crystal cells as variable retarders. Each one of these retarders can be realized also by means of an electro-optic crystal belonging to the symmetry point group of the zincblende (ZnS), such as CdTe, CdZnTe, GaAs and AlGaAs, or by means of an elasto-optic squeezer. Furthermore, a two-stage configuration has been presented as a second embodiment which avoids the intrinsic 3 dB-loss of the single stage configuration of the first embodiment In the second embodiment, the two stages are controlled independently by respective algorithms that are similar to that used for the single stage configuration.

10. References

1. L. J. Rysdale, "Method of overcoming finite-range limitation of certain state of polarization control devices in automatic polarization control schemes", *Electronic Letters,* vol. 22, pp. 100-102 (1986).
2. R. Noé, "Endless polarization control in coherent optical communications", *Electronic Letters,* vol. 22, pp. 772-773 (1986).
3. R. Noé, "Endless polarization control experiment with three elements of limited birefringence", *Electronic Letters,* vol. 22, pp. 1341-1343 (1986).
4. N. G. Walker, and G. R. Walker, "Endless polarization control using four fiber squeezers", *Electronic Letters,* vol. 22, pp. 290-292 (1987).
5. C. J. Mahon, and G. D. Kohe, "Endless polarization state matching control experiment using two controllers of finite control range", *Electronic Letters,* vol. 23, pp. 1234-1235 (1987).

6. R. Noé, H. Heidrich, and D. Hoffmann, "Endless polarization control systems for coherent optics", *Journal of Lightwave Technology*, vol. 6, pp. 1199-1207 (1988).
7. W. H. J. Aarts, and G. D. Kohe, "New endless polarization control method using three fiber squeezers", *Journal of Lightwave Technology*, vol. 7, pp. 1033-1043 (1989).
8. N. G. Walker, and G. R. Walker, "Polarization control for coherent communications", *Journal of Lightwave Technology*, vol. 8, pp. 438-458 (1990).
9. S. H. Rumbaugh, M. D. Jones, and L. W. Casperson, "Polarization control for coherent fiber-optic systems using nematic liquid crystals", *Journal of Lightwave Technology*, vol. 8, pp. 459A465 (1990).
10. S. H. Rumbaugh, M. D. Jones, and P. J. Bos, "Polarization controller for use in optical fiber communication system", U.S. Pat. No. 4,979,235 (1990).
11. M. G. Clark, and I. D. W. Samuel, "Polarization controller", U.S. Pat. No. 5,005,952 (1991).
12. A. Ichikawa, T. Takeda, and S. Matsuura, "Polarization control system", U.S. Pat. No. 5,191,387 (1993).
13. H. G. Jerrard, "Modem description of polarized light: matrix methods", *Optics and Laser Technology*, pp. 309-319 (1992).
14. B. E. A. Saleh, M. C. Teich, *Fundamentals of photonics*, chapter 18 (John Wiley & Sons Inc., 1991).

What is claimed is:

1. A polarization stabilizing device for stabilizing the state of polarization of an optical signal having an arbitrary time variable polarization state and an input power, comprising:
a retarder pair comprising first and second variable retarders operable to provide respective first and second phase retardations to the optical signal, wherein the first and second variable retarders have respective eigenaxes oriented at approximately ±45 degrees relative to each other;
an optical element arranged to receive the optical signal from the second variable retarder and having an azimuth extending approximately parallel or perpendicular to the first variable retarder so as to pass a polarized component of the optical signal containing a fraction of the input power;
a detection arrangement for obtaining a measurement signal indicative of the fraction of the input power of the optical signal contained in the polarized component; and
a controller connected to receive the measurement signal, and connected to supply first and second control signals to the first and second variable retarders,
wherein the controller is configured to set the first and second control signals responsive to the measurement signal so as to maintain the fraction of the input power in the polarized component at a target value, and
wherein the controller is further configured to use the first control signal to commute the first phase retardation between first and second values so as to cause a commutation of the polarization state transmitted by the second variable retarder between two diametrically opposite positions on a Poincaré sphere.

2. The device according to claim 1, wherein the controller is further configured to use the second control signal to vary the second phase retardation responsive to the measurement signal so as to transform the input arbitrary time variable polarization state into an elliptical output polarization state with axes parallel to the eigenaxes of the second variable retarder.

3. The device according to claim 1, wherein the first and second values of the first phase retardation are zero and $\pi$ radians.

4. The device according to claim 2, wherein a range of variation of the second phase retardation is at least $\pi$ radians.

5. The device according to claim 1, wherein the optical element is a polarizing beam splitter.

6. The device according to claim 1, wherein the optical element is a linear polarizer.

7. The device according to claim 1, further comprising a further detection arrangement for measuring a further measurement signal indicative of the input power of the optical signal, and connected to supply the further measurement signal to the controller, wherein the controller is configured to set the first and second control signals also responsive to the further measurement signal, so as to maintain the fraction of the input power in the polarized component at the target value.

8. The device according to claim 1, wherein the controller is configured to use the first control signal to commute the first phase retardation when the second phase retardation reaches a range limit.

9. The device according to claim 8, wherein the controller is configured to use the first control signal to keep the first phase retardation constant when the second phase retardation is not at a range limit.

10. The device according to claim 1, wherein the controller is configured to use the first control signal to commute the first phase retardation when the state of polarization of the optical signal transmitted by the first variable retarder has axes parallel to the eigenaxes of the second variable retarder.

11. A polarization stabilizing device for stabilizing the state of polarization of an optical signal having an arbitrary time variable polarization state and an input power, comprising a first stage and a second stage arranged to receive output from the first stage, the first stage comprising:
a first-stage retarder pair comprising first and second variable retarders operable to provide respective first and second phase retardations to the optical signal, wherein the first and second variable retarders have respective eigenaxes oriented at approximately ±45 degrees relative to each other;
a first-stage optical element arranged to receive the optical signal from the second variable retarder and having an azimuth extending approximately parallel or perpendicular to the first variable retarder so as to pass a polarized component of the optical signal containing a fraction of the input power;
a first-stage detection arrangement for obtaining a measurement signal indicative of the fraction of the input power of the optical signal contained in the polarized component; and
a first-stage controller connected to receive the measurement signal, and connected to supply first and second control signals to the first and second variable retarders, wherein the first-stage controller is configured to set the first and second control signals responsive to the measurement signal so as to supply the optical signal to a first variable retarder of the second stage in an elliptical state of polarization that belongs to a great circle on a Poincaré sphere, wherein the controller is configured to use the first control signal to commute the first phase retardation between first and second values so as to cause a commutation of the polarization state transmitted by the second variable retarder between two diametrically opposite positions on the Poincaré sphere, and the second stage comprising:

a second-stage retarder pair comprising first and second variable retarders operable to provide respective first and second phase retardations to the optical signal, wherein the first and second variable retarders have respective eigenaxes oriented at approximately ±45 degrees relative to each other;

a second-stage optical element arranged to receive the optical signal from the second variable retarder and having an azimuth extending at approximately 0 or 90 degrees to the eigenaxes of the first variable retarder so as to pass a polarized component of the optical signal containing a fraction of the input power;

a second-stage detection arrangement for obtaining a measurement signal indicative of the fraction of the input power of the optical signal contained in the polarized component; and a second-stage controller connected to receive the measurement signal, and connected to supply first and second control signals to the first and second variable retarders, wherein the second-stage controller is configured to set the first and second control signals responsive to the measurement signal so as to maintain the fraction of the input power in the polarized component at a target value.

12. The device of claim 11, wherein the elliptical state of polarization that belongs to said great circle on the Poincaré sphere has axes parallel to the eigenaxes of the second variable retarder.

13. The device of claim 11, wherein the controller is configured to use the second control signal to vary the second phase retardation over a range of at least π radians responsive to the measurement signal, and to use the first control signal to commute the first phase retardation when the second phase retardation reaches a range limit.

14. The device of claim 11, wherein the eigenaxes of the first variable retarder of the second stage are oriented at ±45° with respect to the eigenaxes of the first variable retarder of the first stage.

15. A method of transforming an input optical signal of arbitrary state of polarization (SOP) into an output optical signal of an elliptical SOP that belongs to a great circle on a Poincaré sphere and of a power that is independent of the arbitrary SOP of the input optical signal, the method comprising:

providing first and second variable retarders having controllable phase retardation and respective eigenaxes oriented at approximately ±45 degrees relative to each other;

providing an optical element arranged to receive the optical signal from the second variable retarder and having an azimuth extending approximately parallel or perpendicular to the first variable retarder; and controlling the phase retardation of the first and second retarders so as to:

transform the arbitrary SOP of the input optical signal into the output optical signal of the elliptical SOP that belongs to the great circle on the Poincaré sphere and of the power that is independent of the arbitrary SOP of the input optical signal, and so as to commute the phase retardation of the first retarder between first and second values, in order to cause a commutation of the SOP transmitted by the second variable retarder between two diametrically opposite positions on the Poincaré sphere.

16. The method according to claim 15, wherein the first and second retarders are controlled so as to change the phase retardation of the second retarder continuously or quasi-continuously within a range defined by upper and lower limits, the phase retardation of the first retarder being commuted between said first and second values responsive to the phase retardation of the second retarder reaching its upper or lower limit.

17. The method according to claim 16, wherein the first and second values of the phase retardation of the first retarder correspond to the upper and lower limits of the phase retardation of the second retarder.

18. The method according to claim 15, wherein the elliptical SOP of the output optical signal has axes parallel to the eigenaxes of the second variable retarder.

19. The method according to claim 15, wherein the phase retardation of the first retarder is commuted when the SOP of the optical signal transmitted by the first variable retarder has axes parallel to the eigenaxes of the second variable retarder.

20. A method of transforming an input optical signal of arbitrary state of polarization (SOP) into an output optical signal of a defined SOP and of a power that is independent of the SOP of the input optical signal, the method comprising:

providing first and second stages, each comprising first and second variable retarders having controllable phase retardation;

providing an optical element in the second stage for passing a polarized component of the optical signal received from the second variable retarder of the second stage;

receiving an input optical signal having an arbitrary SOP at the first stage;

controlling the phase retardation of the first and second retarders of the first stage so as to:

transform the arbitrary SOP of the input optical signal into an optical signal of elliptical SOP that belongs to a great circle on a Poincaré sphere, and commute the phase retardation of the first retarder between first and second values in order to cause a commutation of the SOP transmitted by the second variable retarder between two diametrically opposite positions on the Poincaré sphere;

receiving the optical signal of elliptical SOP from the first stage into the second stage; and controlling the phase retardation of the first and second retarders of the second stage so as to transform the optical signal of elliptical SOP into an output optical signal of a defined SOP and of a power that is independent of the arbitrary SOP of the input optical signal.

21. The method according to claim 20, wherein, for each of the first and second stages, the first and second retarders are controlled so as to commute the phase retardation of the first retarder between respective first and second values, and so as to change the phase retardation of the second retarder continuously or quasi-continuously within a range defined by upper and lower limits, the phase retardation of the first retarder being commuted between the respective first and second values responsive to the phase retardation of the second retarder reaching its upper or lower limit.

22. The method according to claim 21, wherein, for each of the first and second stages, the first and second values of the phase retardation of the first retarder correspond to the upper and lower limits of the phase retardation of the second retarder.

23. The method according to any one of claims 20 to 22, wherein, in the first and second stages, the first and second variable retarders have respective eigenaxes oriented at approximately ±45 degrees relative to each other, wherein the optical element of the second stage has an azimuth extending approximately parallel or perpendicular to the eigenaxes of the first variable retarder of the second stage, and wherein the eigenaxes of the first variable retarder of the second stage are oriented at approximately ±45 degrees relative to the eigenaxes of the first variable retarder of the first stage.

* * * * *